(12) United States Patent
Hashida et al.

(10) Patent No.: US 8,282,716 B2
(45) Date of Patent: Oct. 9, 2012

(54) GAS ADSORBING DEVICE, VACUUM HEAT INSULATOR MAKING USE OF GAS ADSORBING DEVICE AND PROCESS FOR PRODUCING VACUUM HEAT INSULATOR

(75) Inventors: Masamichi Hashida, Shiga (JP); Kazutaka Uekado, Shiga (JP); Akiko Yuasa, Kyoto (JP)

(73) Assignee: Panasonic Corporation, Osaka (JP)

( * ) Notice: Subject to any disclaimer, the term of this patent is extended or adjusted under 35 U.S.C. 154(b) by 9 days.

(21) Appl. No.: 12/796,323

(22) Filed: Jun. 8, 2010

(65) Prior Publication Data
US 2010/0242735 A1    Sep. 30, 2010

Related U.S. Application Data

(62) Division of application No. 11/995,832, filed on Jan. 16, 2008, now Pat. No. 7,988,770.

(30) Foreign Application Priority Data

| Sep. 26, 2005 | (JP) | ................. | 2005-277764 |
| Dec. 8, 2005 | (JP) | ................. | 2005-354423 |
| Sep. 1, 2006 | (JP) | ................. | 2006-237237 |
| Sep. 1, 2006 | (JP) | ................. | 2006-237238 |
| Sep. 1, 2006 | (JP) | ................. | 2006-237239 |
| Sep. 1, 2006 | (JP) | ................. | 2006-237240 |

(51) Int. Cl.
*B01D 53/02* (2006.01)
(52) U.S. Cl. .................................... 96/134; 96/147
(58) Field of Classification Search .............. 95/95, 101, 95/102; 96/9, 149, 154; 55/359
See application file for complete search history.

(56) References Cited

U.S. PATENT DOCUMENTS

| 2,994,404 | A | * | 8/1961 | Schifferly ................. 96/117.5 |
| 5,191,980 | A | | 3/1993 | Boffito et al. |
| 5,375,423 | A | | 12/1994 | Delatte |

(Continued)

FOREIGN PATENT DOCUMENTS
EP    0511177 A1    10/1992
(Continued)

OTHER PUBLICATIONS

Japanese Office Action No. for JP 2005-277764 dated Nov. 16, 2010.

(Continued)

*Primary Examiner* — Duane Smith
*Assistant Examiner* — Christopher P Jones
(74) *Attorney, Agent, or Firm* — Pearne & Gordon LLP

(57) ABSTRACT

A jacket material into which a gas adsorbing device and core material are inserted is decompressed in a vacuum chamber, the opening is sealed, and then the jacket material is exposed to the atmosphere. In the atmospheric pressure, a pressure of about 1 atm which is equivalent to the pressure difference between the inside and outside is applied to the jacket material of the heat insulator. The jacket material is made of a plastic laminated film and is deformed by pressure. A protruding portion is plunged into a container to drill through holes, and a gas adsorbent in the container communicates with the inside of the jacket material. Thus, both during holding and in applying to the vacuum heat insulator, the gas adsorbent can be applied to the vacuum heat insulator without degradation, and the high degree of vacuum can be kept for a long time.

10 Claims, 15 Drawing Sheets

U.S. PATENT DOCUMENTS

| | | | |
|---|---|---|---|
| 5,544,490 A | 8/1996 | Manini et al. | |
| 5,551,557 A | 9/1996 | Brooks et al. | |
| 5,600,957 A | 2/1997 | Manini et al. | |
| 5,746,984 A * | 5/1998 | Hoard | 422/169 |
| 2006/0107642 A1 * | 5/2006 | Smith et al. | 55/524 |

FOREIGN PATENT DOCUMENTS

| | | |
|---|---|---|
| EP | 1 022 781 A1 | 7/2000 |
| GB | 2271839 A | 4/1994 |
| JP | 61-103090 A | 5/1986 |
| JP | 62-187618 U | 11/1987 |
| JP | 04-337195 A | 11/1992 |
| JP | 05-092136 A | 4/1993 |
| JP | 05-254588 A | 10/1993 |
| JP | 09-512088 A | 12/1997 |
| JP | 9-512088 A | 12/1997 |
| JP | 2000-036391 A | 2/2000 |
| JP | 2000-091690 A | 3/2000 |
| JP | 2003-269687 A | 9/2003 |
| JP | 2003-269688 | 9/2003 |
| JP | 2005-015267 A | 1/2005 |

OTHER PUBLICATIONS

International Search Report; Dec. 12, 2006.
Chinese Office Action.
European Search Report for EP 06810438 dated Oct. 17, 2011.
European Search Report for application No. 12166138.3-1252 dated Jun. 6, 2012.
Partial translation of JP 2005-015267 A, which was previously filed in the IDS dated Jun. 8, 2010.

* cited by examiner

GAS ADSORBING DEVICE, VACUUM HEAT INSULATOR MAKING USE OF GAS ADSORBING DEVICE AND PROCESS FOR PRODUCING VACUUM HEAT INSULATOR

This application is a division of U.S. patent application Ser. No. 11/995,832 filed Jan. 16, 2008 and now issued as U.S. Pat. No. 7,988,770 B2, which is incorporated herein by reference in its entirety.

TECHNICAL FIELD

The present invention relates to a gas adsorbing device that has a gas adsorbent and adsorbs gas with the gas adsorbent, a vacuum heat insulator that has the gas adsorbing device and exhibits heat insulation performance by adsorbing internal gas with the gas adsorbing device, and a process for producing a vacuum heat insulator.

BACKGROUND ART

Recently, expectations for industrial technology requiring high vacuum have been raised. For instance, energy saving has been strongly desired from the viewpoint of prevention of global warming, and energy saving of consumer electronics has been also an urgent issue. Especially, a thermal insulation apparatus such as a refrigerator, a freezer, or a vending machine requires a heat insulator having high heat insulation performance from the viewpoint of efficient use of heat.

As a general heat insulator, fiber material such as glass wool or foam such as urethane foam is used. However, for improving the heat insulation performance of the heat insulator, the heat insulator must be thinned. The heat insulator cannot be applied, when space capable of being filled with the heat insulator is restricted and space saving and effective use of the space are required.

As a heat insulator of high heat insulation performance, a vacuum heat insulator is proposed. This vacuum heat insulator is produced by inserting a core material serving as a spacer into a jacket material having gas barrier property, and by decompressing and sealing the inside.

The heat insulation performance can be increased by increasing the degree of vacuum inside the vacuum heat insulator, but gas existing inside the vacuum heat insulator is broadly classified into three following gases:
  gas remaining without being exhausted in producing the vacuum heat insulator;
  gas generated from the core material or jacket material after decompression and sealing (gas adsorbed by the core material or jacket material or reaction gas generated by reaction of an un-reacted component in the core material); and
  gas coming from the outside through the jacket material.

For adsorbing the gases, a method of filling a gas adsorbent into the vacuum heat insulator is provided.

For instance, Japanese Patent Unexamined Publication No. H09-512088 discloses a method of adsorbing the gas in the vacuum heat insulator using a Ba—Li alloy.

Of gases to be adsorbed by the gas adsorbent in the vacuum heat insulator, a hard-to-adsorb gas is nitrogen. That is because nitrogen molecules are non-polar molecules having a large binding energy of about 940 kJ/mol and hence are difficult to be activated. Therefore, using the Ba—Li alloy allows adsorption of nitrogen, and keeps the degree of vacuum of the inside of the vacuum heat insulator.

However, the gas adsorbent that is used for a conventional vacuum heat insulator and disclosed in Japanese Patent Unexamined Publication No. H09-512088 can be handled in an air atmosphere only for several minutes. This is described as "the gas adsorbent does not require heat treatment for activation, can absorb nitrogen even at normal temperature, and can be handled in an air atmosphere only for several minutes". That is because handling in the air atmosphere for several minutes or longer exhausts the nitrogen adsorbing capability of the gas adsorbent in a producing step where the gas adsorbent comes into contact with air. As a result, air adsorbing capability for keeping the performance of the vacuum heat insulator including the gas adsorbent over time is reduced, and hence the performance degrades and performance fluctuation increases. For preventing the reduction of the nitrogen adsorbing capability of the gas adsorbent, the handling time in an air atmosphere is restricted to several minutes.

In the step of industrially producing the vacuum heat insulator using the gas adsorbent, however, it is desired that the gas adsorbent can be handled in an air atmosphere for a longer time. When the gas adsorbent is handled in the air atmosphere even for several minutes, some reduction of the nitrogen adsorbing capability is unavoidable.

The level of the activity of the gas adsorbent, namely time until the nitrogen adsorbing capability is saturated during leaving of the gas adsorbent in the atmosphere, depends on the form of the gas adsorbent and material specification. For example, when the gas adsorbent has a pellet shape, the nitrogen adsorbing capability is not saturated even when it is left in the atmosphere for a relatively long time. When the gas adsorbent is in powder form, the specific surface area becomes large and hence the nitrogen adsorbing capability is saturated only by being left in the atmosphere for a short time.

Therefore, when a powdery gas adsorbent that has an activity higher than that of Ba—Li is used, the contactable time with the atmosphere can be extremely reduced.

Recent growing of the demand of energy saving or the like has required higher heat insulation performance. For further increasing the degree of vacuum inside the vacuum heat insulator, it is desired to put the gas adsorbent of activity higher than that of Ba—Li to practical use. However, such a gas adsorbent of higher activity is difficult to be handled.

SUMMARY OF THE INVENTION

The present invention addresses the problems and provides the following technology. Even when a powdery gas adsorbent or the like of high activity is used for obtaining higher heat insulation performance, preventing air exposure in the producing step produces the following effects:
  the gas adsorbing capability does not reduce;
  internal gas is continuously adsorbed for a long time when the gas adsorbent is applied to a vacuum heat insulator;
  reduction or fluctuation in heat insulation performance does not occur; and
  high degree of vacuum and high heat insulation performance can be kept for a long time.

A gas adsorbing device has at least a sealable container including a gas adsorbent and a protrusion adjacent to the container. When external force is applied, the protrusion produces a through hole in the container and the gas adsorbent communicates with the outside. In the case where the gas adsorbent is applied to a vacuum heat insulator or the like, therefore, the gas adsorbent comes into contact with the gas to be adsorbed by it after vacuum decompression and sealing of the opening is performed. As a result, the gas adsorbent does not come into contact with air of relatively high pressure, and degradation thereof can be minimized.

In the gas adsorbing device of the present invention, the protrusions are fixed via a plate-like member and hence the protruding portions are arranged in a two-dimensional plane shape. The protruding portions certainly come into contact with the container. When external force is applied, the gas adsorbent certainly can come into contact with the gas to be adsorbed by it, switching is certainly performed when the gas adsorbent is applied to a vacuum apparatus or the like, and the producing yield of the vacuum apparatus or the like rises. Here, the vacuum apparatus means an apparatus such as a vacuum heat insulator whose function is fulfilled by evacuating the inside. The switching means the phenomenon where the gas barrier property of a gas adsorbing device container is released and the gas adsorbent becomes able to adsorb gas outside the container.

The gas adsorbing device of the present invention has a container including an opening, a partition for blocking the opening, and a gas adsorbent and gas that is not adsorbed by the gas adsorbent in the closed space surrounded by the container and the partition. The gas pressure inside the closed space is lower than atmospheric pressure.

In the gas adsorbing device of the present invention, the contact of the gas adsorbent with the atmosphere is suppressed, by filling the gas adsorbent and the gas that is not adsorbed by the gas adsorbent into the container. For adsorbing the gas in the vacuum apparatus, the gas adsorbent in the container is required to communicate with the inner space of the vacuum apparatus such as the inside of the vacuum heat insulator. The following mechanism allows the gas adsorbent to be installed in the inner space of the vacuum apparatus without contact with the atmosphere of about 1 atm pressure. Here, the vacuum apparatus means an apparatus whose function is fulfilled by evacuating the inside, such as a vacuum heat insulator, a cathode-ray tube, a plasma display panel, or a fluorescent light.

The container includes the opening, and the closed space is formed by surrounding the opening of the container with the partition. The gas in the container applies pressure to the inner wall of the container and the inside of the partition. The atmosphere applies atmospheric pressure to the outer wall of the container and the outside of the partition.

The atmospheric pressure is 1013 hPa, and the pressure inside the container is lower than 1013 hPa. Therefore, the pressure difference applied to the partition is a value derived by subtracting the pressure inside the container from the atmospheric pressure. The partition is pressed to the opening of the container by the pressure difference, so that gas does not move between the inside and outside of the container and the degradation of the gas adsorbent can be prevented.

While, when the outside of the container is decompressed, pressure inside the container becomes equal to pressure outside it at a certain time, and the pressure outside the container becomes higher than the pressure inside it. At the time when the pressure inside the container becomes equal to the pressure outside it, the pressure pressing the partition to the container does not work, and the partition separates from the container. The separation of the partition from the container allows movement of gas between the inside and outside of the container through the opening of the container. This mechanism allows the gas adsorbent to be installed inside the vacuum apparatus without contact with the air at atmospheric pressure.

Thus, in the gas adsorbing device of the present invention, the contact of the gas adsorbent with the atmosphere is prevented at atmospheric pressure, and the gas adsorbent comes into contact with an ambient atmosphere outside the gas adsorbing device under decompression. Even when the gas adsorbing device is applied to the vacuum apparatus at atmospheric pressure, degradation of the gas adsorbent due to the atmosphere does not occur, and the gas adsorbent can exhibit the essential performance after being applied to the vacuum apparatus.

The gas adsorbing device of the present invention has a container that has an opening at its one end and is partially cylindrical, and a partition in contact with the inner wall of the cylindrical part of the container. A gas adsorbent and gas that is not adsorbed by the gas adsorbent are filled into the closed space surrounded by the container and the partition.

In the gas adsorbing device of the present invention, the contact of the gas adsorbent with the atmosphere is suppressed, by filling the gas adsorbent and the gas that is not adsorbed by the gas adsorbent into the container. For adsorbing the gas in the vacuum apparatus, the gas adsorbent in the container is required to communicate with the inner space of the vacuum apparatus such as the inside of the vacuum heat insulator. The following mechanism allows the gas adsorbent to be installed in the inner space of the vacuum apparatus without contact with the atmosphere of about 1 atm pressure.

At least a part of the container is cylindrical, and the cylindrical part has an opening. The cylindrical part has a partition. This partition blocks the opening of the cylindrical part to form the closed space, suppresses infiltration of air into the container, and prevents the contact of the gas adsorbent with the atmosphere. Gas that is not adsorbed by the gas adsorbent is filled into the closed space. When the gas adsorbing device is placed at atmospheric pressure, a balance is kept between the atmospheric pressure and the pressure of the non-adsorbent gas, and net force is not applied to the partition.

When the gas adsorbing device is installed in a vacuum apparatus such as a vacuum heat insulator and the installation space is decompressed, the pressure inside the closed space surrounded by the container and partition becomes higher than the ambient pressure and the non-adsorbent gas expands. The pressure generated by the expansion moves the partition toward the opening of the cylindrical part, thereby separating the partition from the cylindrical part of the container. Therefore, the gas adsorbent comes into contact with the external space after the decompression. This mechanism allows the gas adsorbent to be installed inside the vacuum apparatus without contact with the air at atmospheric pressure.

Thus, in the gas adsorbing device of the present invention, the contact of the gas adsorbent with the atmosphere is prevented at atmospheric pressure, and the gas adsorbent comes into contact with an ambient atmosphere outside the gas adsorbing device under decompression. Even when the gas adsorbing device is applied to the vacuum apparatus at atmospheric pressure, degradation of the gas adsorbent due to the atmosphere does not occur, and the gas adsorbent can exhibit the essential performance after being applied to the vacuum apparatus.

The gas adsorbing device of the present invention has a container including a shell and a communication part, and includes the gas adsorbent in the container. The shell covers a gas adsorbent. The communication part prevents the inside of the shell from communicating with the outside thereof when no external force is applied, and allows the inside of the shell to communicate with the outside thereof when an external force is applied.

In the gas adsorbing device of the present invention, the gas adsorbent does not come into contact with gas in outer space such as air when no external force is applied, so that the gas adsorbent can be held without consuming the gas adsorbing capability. When an external force is applied, communications between the inner space and outer space of the container are allowed to exhibit the gas adsorbing capability. Therefore, the degradation of the adsorbing performance is suppressed until the adsorbing capability is exhibited, and the adsorbing capability of the gas adsorbent can be exhibited at a maximum.

In the vacuum heat insulator employing the gas adsorbing device of the present invention, the gas adsorbent is not devitalized by the contact with the atmosphere during producing the vacuum heat insulator. The gas adsorbent stably adsorbs main air components such as a minute amount of nitrogen and oxygen infiltrating into the vacuum heat insulator with time, the degree of vacuum can be kept for a long time, and high heat insulation performance can be provided.

A producing process of the vacuum heat insulator of the present invention is as follows. An air component adsorbent that is gas-packaged into the adsorbent filling body together with non-adsorbent gas is arranged inside the jacket container together with a porous core material and decompressed. The non-adsorbent gas in the adsorbent filling body is evacuated through an opening that is formed by bursting a part of the adsorbent filling body that is expanded by pressure difference by the decompression. The jacket container is then sealed.

The air component adsorbent is gas-packaged together with the non-adsorbent gas, is burst in a vacuum atmosphere, and is vacuum-packaged together with the porous core material, so that contact with the air in the atmosphere does not occur in the producing step and the degradation of the adsorbent is prevented. The adsorbent can be used without problems regardless of the amount of the producing time of the vacuum heat insulator. A vacuum heat insulator is provided that prevents fluctuation in adsorbing performance due to exposure in the air atmosphere, can be stably produced, and has satisfactory long-term reliability.

The vacuum heat insulator of the present invention has a gas adsorbing device. The gas adsorbing device has at least an air component adsorbent arranged in the adsorbent filling body having an opening, a porous core material, and a jacket container for storing them. The air component adsorbent communicates with the vacuum space inside the vacuum heat insulator through the opening.

A minute amount of residual air remaining in the porous core material and a minute amount of air infiltrating from the outside can be adsorbed and immobilized by the air component adsorbent that communicates with the porous core material through the vacuum space. The internal pressure can be kept at a predetermined degree of vacuum. Thus, high heat insulation performance can be kept for a long time.

A producing process of the vacuum heat insulator of the present invention is as follows. An air component adsorbent and a non-adsorbent gas that is not adsorbed by the air component adsorbent are filled into a filling container. Here, the filling container opens when the pressure outside the filling container is lower than the pressure inside it by a predetermined value or more. The filling container and the porous core material are disposed in the jacket container. Then, the inside of the jacket container is decompressed so that the pressure outside the filling container is lower than the pressure inside it by the predetermined value or more, thereby exhausting the non-adsorbent gas from the filling container and the air in the jacket container through the opening formed in the filling container. The jacket container is then sealed.

In the producing process of the vacuum heat insulator, the air component adsorbent, together with non-adsorbent gas, is filled into the filling container, the filling container in a vacuum atmosphere is opened, and the vacuum heat insulator is vacuum-packaged together with the porous core material. Therefore, contact with the air in the atmosphere does not occur in the producing step, and the degradation of the adsorbent is prevented. The adsorbent can be therefore used without problems regardless of the amount of the producing time of the vacuum heat insulator. A vacuum heat insulator is provided that prevents fluctuation in adsorbing performance due to exposure in the air atmosphere, can be stably produced, and has long-term reliability without problems.

The filling container has a structure where the openings of different sizes included in two containers are overlapped and joined so that the opening of one container is blocked by the opening of the other container. When the pressure outside the filling container is lower than the pressure inside it by a predetermined value or more, the overlapped and joined part is separated.

At this time, when the overlapped and joined part of the filling container is previously coated with a lubricant, the pressure difference by the decompression allows easy separation of the joint to form an opening.

The vacuum heat insulator of the present invention has at least the following elements:
  an air component adsorbent arranged in the filling container in which separation of the joint produces an opening;
  a porous core material; and
  a jacket container for storing them.

The air component adsorbent communicates with the continuous space inside the jacket container through the opening. A minute amount of residual air remaining in the porous core material and a minute amount of air infiltrating from the outside can be adsorbed and immobilized by the air component adsorbent that communicates with the porous core material through the continuous space. The internal pressure of the jacket container, namely the internal pressure of the vacuum heat insulator, can be kept at a predetermined degree of vacuum. Thus, high heat insulation performance can be kept for a long time. Here, the filling container can have an arbitrary shape and size, and may be a capsule used for medicine or health food. The capsule means a hard capsule including a body and a cap, and is defined as a pair of closed-end cylindrical bodies capable of being overlapped each other.

As discussed above, in the gas adsorbing device of the present invention, the contact of the gas adsorbent with the atmosphere is prevented at atmospheric pressure, and the gas adsorbent comes into contact with an ambient atmosphere outside the gas adsorbing device under decompression. Even when the gas adsorbing device is applied to the vacuum apparatus at atmospheric pressure, degradation of the gas adsorbent due to the atmosphere does not occur, and the gas adsorbent can exhibit the essential performance after it is applied to the vacuum apparatus. The vacuum heat insulator of the present invention stably achieves high insulation performance, can secure long-term reliability, and produces a remarkable effect of addressing environmental issues such as global warming.

Figure 1:
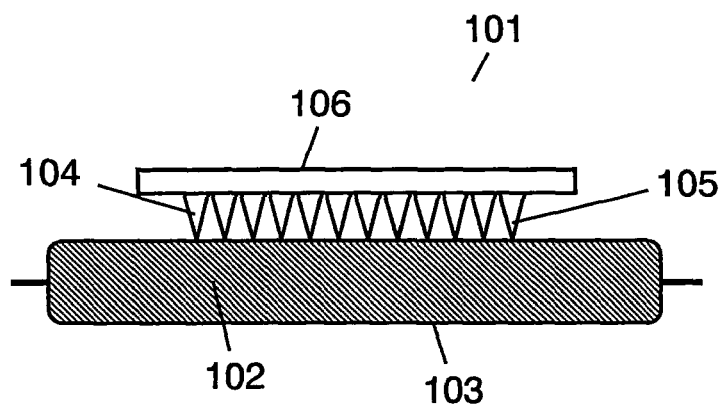
FIG. 1 is a sectional view of a gas adsorbing device in accordance with a first exemplary embodiment of the present invention.

REFERENCE MARKS IN THE DRAWINGS 101, 201, 301, 422 gas adsorbing devices
102, 205, 305, 402 gas adsorbents
103, 203, 401, 409, 415 containers
104 protrusion
105 protruding portion
106 plate-like member
107, 207, 307 vacuum heat insulators
108, 208, 308 core materials
109, 209, 309 jacket materials
110, 202, 302 openings
111 rubber plug
112 film
204, 304 partitions
206, 306 non-adsorbent gases
210, 310 packaging materials
211, 311 covering materials
212, 312 dividers
303 cylindrical container
313 seal

DETAILED DESCRIPTION OF PREFERRED EMBODIMENTS

A gas adsorbing device of the present invention has at least a sealable container including a gas adsorbent and a protrusion adjacent to the container. When an external force is applied, the protrusion produces a through hole in the container, and the gas adsorbent communicates with the outside.

The handling condition of the gas adsorbent becomes severe, as the activity thereof becomes high and the specific surface area thereof becomes large. In other words, the contactable time and the contactable pressure with air decrease. Not only degradation during holding such a gas adsorbent but also degradation in installing it in a vacuum apparatus causes problems. Therefore, in installing the gas adsorbent in the vacuum apparatus, it is required to make the gas adsorbent communicate with the outside after the pressure in a vacuum chamber completely decreases.

When a gas adsorbent is applied to a vacuum heat insulator as one example of the vacuum apparatuses, a product obtained by inserting a core material and the gas adsorbent into a jacket material of gas barrier property is installed in the chamber, then the chamber is decompressed, the inside of the jacket material is decompressed, and then an opening in the jacket material is sealed.

At this time, the inside of the chamber is decompressed with a vacuum pump. A high-pressure region, namely before vacuum sealing, can be decompressed with any of a pump and adsorbent. While, in a low pressure region, namely the inside of the jacket material after vacuum sealing, there are gas that is not completely decompressed by the vacuum pump, gas that infiltrates through the jacket material after vacuum sealing, and gas that generates from the core material. These gasses can be adsorbed only by the gas adsorbent. Therefore, for making the gas adsorbent exhibit its capability sufficiently inside the jacket material after vacuum sealing, the communication with the outside is required after vacuum sealing.

As one of means for making the gas adsorbent communicate with the outside, a method of using the atmospheric pressure applied to the jacket material after vacuum sealing is appropriate, as described below.

After vacuum-sealing the jacket material, pressure equivalent to the pressure difference between the inside and outside thereof, namely substantially a pressure of 1 atm, is applied to the jacket material. When the atmospheric pressure is applied to the inside of the jacket material, a protrusion in the jacket material is pressed to the container by the intensity of the atmospheric pressure, a through hole occurs in the container, and the gas adsorbent communicates with the outside.

Required mechanical characteristics of the jacket material are gas barrier property, deformation by the atmospheric pressure, and transfer of the atmospheric pressure to the protrusion and container. More preferably, a through hole is drilled in the container by the protrusion at a pressure of the atmospheric pressure or lower.

The container of the present invention is required to have sealing property, namely gas barrier property, and have mechanical strength withstanding the handling during holding. The protrusion preferably has large hardness. A preferable relationship between the mechanical strengths of the container and protrusion is that the hardness of the protrusion is larger than that of the container and a through hole is drilled in the container by pressing the protrusion to the container. The container and protrusion can be made of plastics, metal, or a complex of them.

In a gas adsorbing device of the present invention, the container is obtained by forming a film or sheet having gas barrier property in a bag shape.

Since the film used as the container has gas barrier property, the gas adsorbent of high activity can be kept in the atmosphere for a long time. Since the container is formed of the film, a through hole is easily drilled by pressing the protrusion, and the adsorbent can be made to communicate with the outside more certainly.

The film or sheet having gas barrier property means that its gas permeability is $10^4$ [$cm^3/m^2$-day-atm] or lower, more preferably $10^3$ [$cm^3/m^2$-day-atm] or lower. Specifically, the film or sheet of plastics such as ethylene-vinylalcohol copolymer, nylon, polyethylene terephthalate, or polypropylene is formed in a bag shape. However, the present invention is not limited to these. Preferably, the gas barrier property is increased by sticking metal foil to the plastic film or evaporating metal onto it. Metal applicable to the metal foil or evaporation can be gold, copper, or aluminum, but the present invention is not limited to these.

In the gas adsorbing device of the present invention, the container is a plastic molded body having gas barrier property.

Since the container is a plastic molded body having gas barrier property, the gas adsorbent of high activity can be kept in the atmosphere for a long time. The container is hardly distorted by a slight force, and the possibility of breakage of it by handling during holding decreases.

The plastic molded body having gas barrier property means that its gas permeability is $10^4$ [$cm^3/m^2$-day-atm] or lower, more preferably $10^3$ [$cm^3/m^2$-day-atm] or lower. Specifically, the molded body is made of plastics such as ethylene-vinylalcohol copolymer, nylon, polyethylene terephthalate, or polypropylene. However, the present invention is not limited to these. For improving the gas barrier property, evaporation may be applied to the molded body. Metal foil may be buried in it.

In the gas adsorbing device of the present invention, an opening is disposed in part of the container, the opening is covered with an elastic body partition, and a protrusion is adjacent to the partition.

Since the elastic body partition is formed on the part of the container, a through hole can be drilled in the partition by the protrusion, and the gas adsorbent can be made to communicate with the outside. The mechanical condition set to a part other than the partition part is easy. In other words, a through hole does not need to be drilled by a protrusion in the part other than the partition, and a container with a high regard to the gas barrier property can be designed. Therefore, the container can be made of a metal molded body or glass molded body.

Here, the elastic body is deformed by stress, and the deformation is returned by releasing the stress. The deformation of metal and plastics returns when the deformation amount is slight, so that they are elastic bodies in a broad sense. For securing the sealing property, it is preferable that the elastic body is largely deformed by slight force so that it can deform in response to the shape of the opening in the container. Therefore, an elastic body such as rubber that is largely deformed by slight force is preferable.

In the gas adsorbing device of the present invention, an opening is disposed in part of the container, the opening is covered with a film having gas barrier property, and a protrusion is adjacent to the partition.

Since the film having gas barrier property is formed on the part of the container, a through hole can be drilled in the film by the protrusion, and the gas adsorbent can be made to communicate with the outside. The mechanical condition set to a part other than the partition part becomes easy. In other words, a through hole does not need to be drilled by a protrusion in the part other than the film, and a container with a high regard to the gas barrier property can be designed. Therefore, the container can be made of metal molded body or glass molded body.

In the gas adsorbing device of the present invention, the protrusion is fixed via a plate-like member, and protruding portions of the protrusion are arranged in a two-dimensional plane shape.

The protruding portions means parts having surface curvature sharply larger than that of other parts on the protrusion. The tangential line in the longitudinal direction of the protruding portions forms an angle of 60° with respect to the parallel direction assumed to be 0°, preferably 90° or more, and more preferably 120° or more.

For drilling a through hole in the container with the protrusion inside a vacuum apparatus, a force is required to be applied to the protrusion while the protruding portions are in contact with the container. The protrusions between the jacket material and the container in the vacuum apparatus have different effects on them dependently on their shape.

For addressing this problem, a plurality of protrusions are fixed to the plate-like member, and the protruding portions are arranged in a two-dimensional plane shape. Since the protruding portions are two-dimensionally arranged in a contact state with the container, applying pressure to the jacket material certainly presses the protruding portions to the container and can prevent contact with parts other than the container.

The plate-like member can be made of structural material such as metal, inorganic material, or plastics, but is not especially specified as long as only a small amount of gas is generated.

As the method of fixing the protrusion to the plate-like member, adhesion with an adhesive, welding, or integral molding is used. However, the method is not especially specified.

The atmospheric pressure is uniformly applied to the whole jacket material. Therefore, the force due to the atmospheric pressure that presses the protrusion to the container is proportional to the inverse of the number per unit area of protrusions that are fixed to the plate-like member. As a result, for certainly drilling through holes in the container and making the adsorbent communicate with the outside, it is preferable that the number of protrusions per unit area is smaller, and the number is $100/cm^2$ or less, preferably $50/cm^2$ or less, and more preferably $25/cm^2$ or less.

In the gas adsorbing device of the present invention, the distance between the protruding portions of the protrusions and the plate-like member is shorter than the thickness of the container.

The distance between the protruding portions of the protrusions and the plate-like member is equal to the length of the protrusions, namely the thickness of an object whose protrusions can drill through holes. When the vacuum apparatus is a vacuum heat insulator and the thickness of the container is smaller than the length of the protrusions, the protrusions having drilled the through holes in the container can also drill through holes in the jacket material of the vacuum heat insulator. When the length of the protrusions is smaller than the thickness of the container, the tips of the protrusions remain inside the container, and hence no through hole is drilled in the jacket material.

In the gas adsorbing device of the present invention, the gas adsorbent is CuZSM-5.

CuZSM-5 has extremely high activity, and an excellent adsorbing characteristic even for low-pressure gas. When CuZSM-5 is used for the gas adsorbing device of the present invention, the gas adsorbent does not come into contact with a high-pressure atmosphere and does not degrade, and hence the adsorbing characteristic can be exhibited in a low-pressure region.

These embodiments of the present invention will be described hereinafter with reference to the accompanying drawings. The present invention is not limited by these embodiments.

(First Exemplary Embodiment)

FIG. 1 is a sectional view of a gas adsorbing device in accordance with a first exemplary embodiment of the present invention.

In FIG. 1, gas adsorbing device 101 includes gas adsorbent 102 in container 103, and protrusions 104 are in contact with container 103. Gas adsorbent 102 is made of powdery CuZSM-5.

Container 103 is formed by filling gas adsorbent 102 into a bag and vacuum-sealing the bag. Here, the bag is prepared by thermally depositing a part of low-density polyethylene of a laminated film with another part thereof. The laminated film is formed by stacking the low-density polyethylene, aluminum foil, and polyethylene terephthalate film in that order. Protrusions 104 are in contact with container 103 via protruding portions 105. Protrusions 104 are fixed to plate-like member 106, and protruding portions 105 are arranged in a two-dimensional plane shape.

Figure 2:
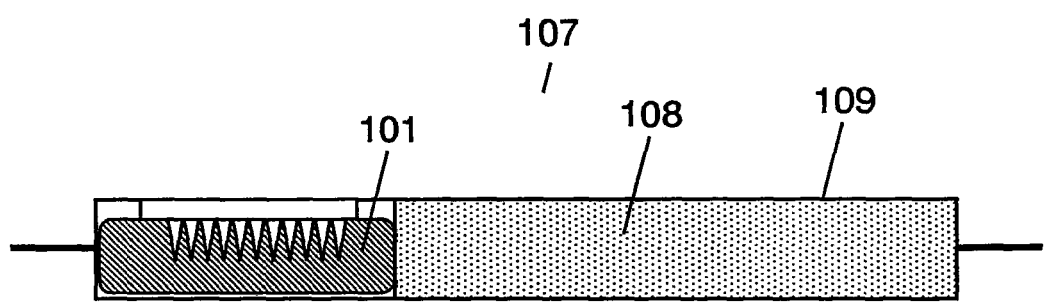
FIG. 2 is a sectional view of a vacuum heat insulator in accordance with the first exemplary embodiment.

FIG. 2 is a sectional view of a vacuum heat insulator in accordance with the first exemplary embodiment of the present invention.

In FIG. 2, vacuum heat insulator 107 is formed by inserting gas adsorbing device 101 and core material 108 into jacket material 109 and then decompressing and sealing jacket material 109.

Figure 3:
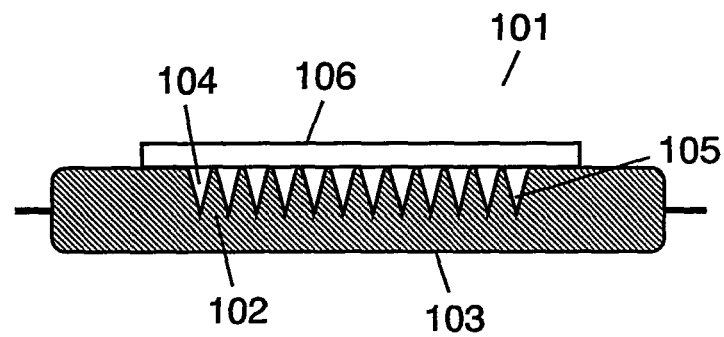
FIG. 3 is a sectional view of the gas adsorbing device after switching in accordance with the first exemplary embodiment.

FIG. 3 is a sectional view of gas adsorbing device 101 after switching in accordance with the first exemplary embodiment.

Regarding gas adsorbing device 101 having such a structure, operations and actions of FIG. 1 through FIG. 3 are described.

Since gas adsorbent 102 is vacuum-sealed in the laminated film having the aluminum foil, gas adsorbent 102 does not come into contact with gas even when gas adsorbing device 101 is left in the atmosphere for a long time. Therefore, gas adsorbent 102 does not degrade and can be held in the atmosphere for a long time.

For adsorbing the gas in jacket material 109 with gas adsorbent 102, a through hole is required to occur in container 103. This is achieved by the following mechanism.

In the step of forming heat insulator 107, jacket material 109 into which gas adsorbing device 101 and core material 108 are inserted is decompressed in a vacuum chamber, the opening is sealed, and then jacket material 109 is exposed to the atmosphere. In the atmospheric pressure, a pressure of about 1 atm, which is equivalent to the pressure difference between the inside and outside of jacket material 109 of heat insulator 107, is applied to them. Jacket material 109 is made of plastic laminated film, so that jacket material 109 is flexible, is deformed by pressure, and applies pressure to adjacent plate-like member 106. The pressure is applied to protrusions 104 fixed to plate-like member 106, protruding portions 105 apply a plunging force to container 103 to drill through holes in container 103, and gas adsorbent 102 communicates with the inside of jacket material 109.

Since protrusions 104 are fixed to plate-like member 106, container 103 comes into contact with protruding portions 105 face to face, and hence the direction hardly shifts. Each protrusion 104 points to a substantially vertical direction to the container, so that a through hole is certainly drilled in container 103.

The distance between protruding portions 105 of protrusions 104 and plate-like member 106 is shorter than the thickness of container 103, so that protruding portions 105 remain inside container 103. Therefore, the plunging force by protrusions 104 is not applied to jacket material 109 of heat insulator 107, and no through hole is drilled in jacket material 109.

Thanks to this mechanism, in either case of holding and application to heat insulator 107, gas adsorbent 102 can be applied to heat insulator 107 without degradation, and reduction of the inner pressure and keeping of the degree of vacuum for a long time are allowed.

(Second Exemplary Embodiment)

Figure 4:
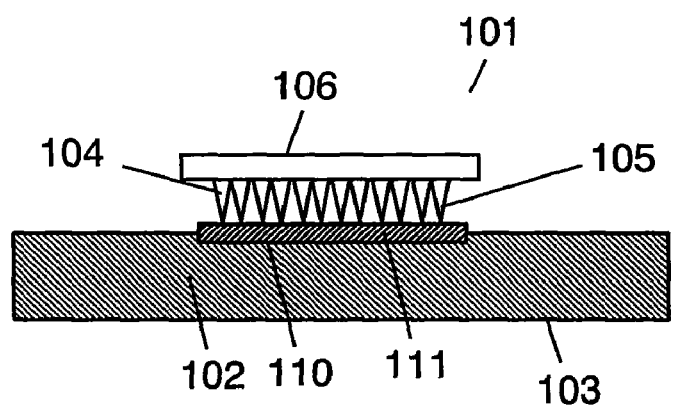
FIG. 4 is a sectional view of a gas adsorbing device in accordance with a second exemplary embodiment of the present invention.

FIG. 4 is a sectional view of gas adsorbing device 101 in accordance with a second exemplary embodiment of the present invention.

In FIG. 4, container 103 has opening 110, and opening 110 is covered with rubber plug 111 to secure air tightness as a whole. Container 103 is made of polyethylene, rubber plug 111 is made of butyl rubber, and the rubber elasticity secures the sealing property of container 103. Protruding portions 105 of protrusions 104 are installed so as to be in contact with rubber plug 111.

Figure 5:
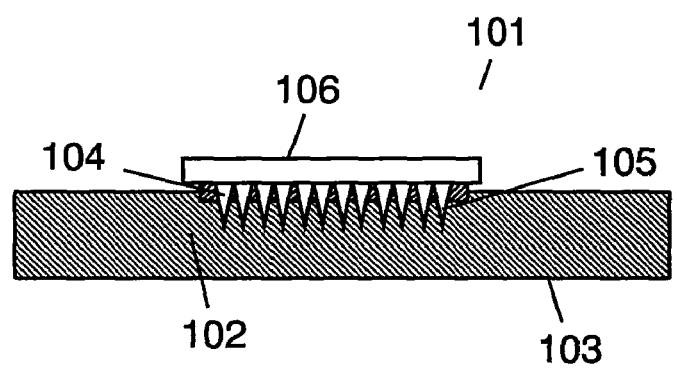
FIG. 5 is a sectional view of the gas adsorbing device after switching in accordance with the second exemplary embodiment.

FIG. 5 is a sectional view of gas adsorbing device 101 after switching in accordance with the second exemplary embodiment of the present invention.

Regarding gas adsorbing device 101 having such a structure, operations and actions are described hereinafter.

Since gas adsorbent 102 is sealed with the polyethylene and rubber plug, gas adsorbent 102 does not come into contact with gas even when gas adsorbing device 101 is left in the atmosphere for a long time. Therefore, gas adsorbent 102 does not degrade and can be held in the atmosphere for a long time.

When gas adsorbing device 101 is applied to a vacuum heat insulator, through holes are drilled in rubber plug 111 due to the atmospheric pressure, and gas adsorbent 102 communicates with the space inside the jacket material.

The operation of gas adsorbing device 101 in preparing the vacuum heat insulator in the present embodiment is the same as that in the first embodiment.

(Third Exemplary Embodiment)

Figure 6:
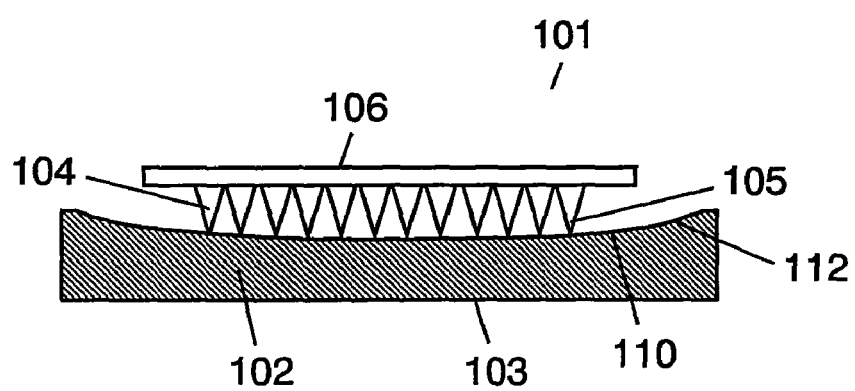
FIG. 6 is a sectional view of a gas adsorbing device in accordance with a third exemplary embodiment of the present invention.

FIG. 6 is a sectional view of gas adsorbing device 101 in accordance with a third exemplary embodiment of the present invention.

In FIG. 6, container 103 has opening 110, and opening 110 is covered with film 112 having gas barrier property to secure the air tightness as a whole. Container 103 is made of polyethylene, and film 112 is a laminated film formed by stacking low-density polyethylene, aluminum foil, and polyethylene terephthalate film in that order, and film 112 is bonded to container 103 by a known method. Protruding portions 105 of protrusions 104 are installed so as to be in contact with the film.

Figure 7:
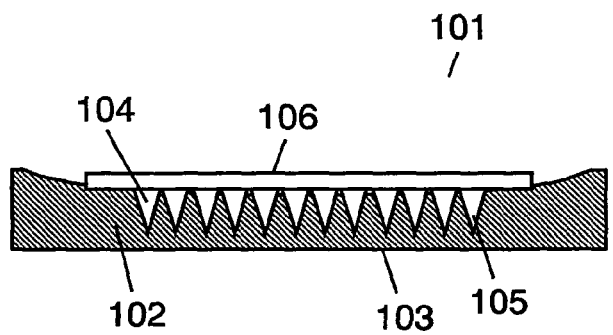
FIG. 7 is a sectional view of the gas adsorbing device after switching in accordance with the third exemplary embodiment.

FIG. 7 is a sectional view of gas adsorbing device 101 after switching in accordance with the third exemplary embodiment of the present invention.

Regarding gas adsorbing device 101 having such a structure, operations and actions are described hereinafter.

Since gas adsorbent 102 is sealed with film 112 having polyethylene and gas barrier property, gas adsorbent 102 does not come into contact with gas even when gas adsorbing device 101 is left in the atmosphere for a long time. Therefore, gas adsorbent 102 does not degrade and can be held in the atmosphere for a long time.

When gas adsorbing device 101 is applied to a vacuum heat insulator, through holes are drilled in film 112, and gas adsorbent 102 communicates with the space inside the jacket material.

The operation of gas adsorbing device 101 in preparing the vacuum heat insulator in the present embodiment is the same as that in the first embodiment.

(Fourth Exemplary Embodiment)

Figure 8:
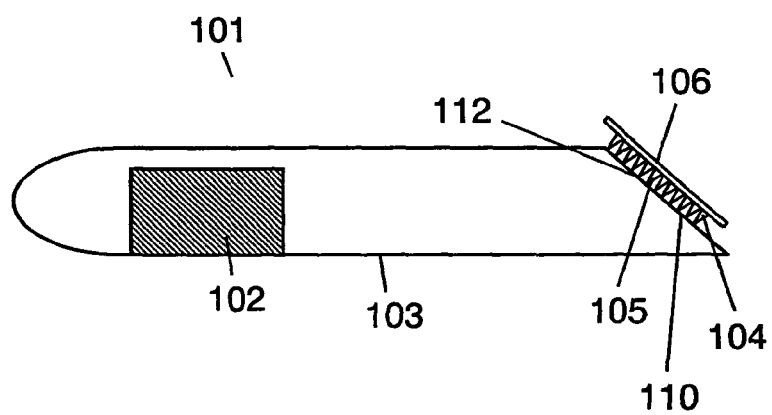
FIG. 8 is a sectional view of a gas adsorbing device in accordance with a fourth exemplary embodiment of the present invention.

FIG. 8 is a sectional view of gas adsorbing device 101 in accordance with a fourth exemplary embodiment of the present invention.

In FIG. 8, container 103 has a cylindrical shape at least partially, and one side of container 103 has opening 110, and the cross section of opening 110 is inclined with respect to the longitudinal direction of container 103. Opening 110 is covered with film 112 having gas barrier property to secure the air tightness as a whole. Container 103 is made of polyethylene, and film 112 is a laminated film formed by stacking low-density polyethylene, aluminum foil, and polyethylene terephthalate film in that order, and film 112 is bonded to container 103 by a known method. Protruding portions 105 of protrusions 104 are installed so as to be in contact with film 112.

Figure 9:
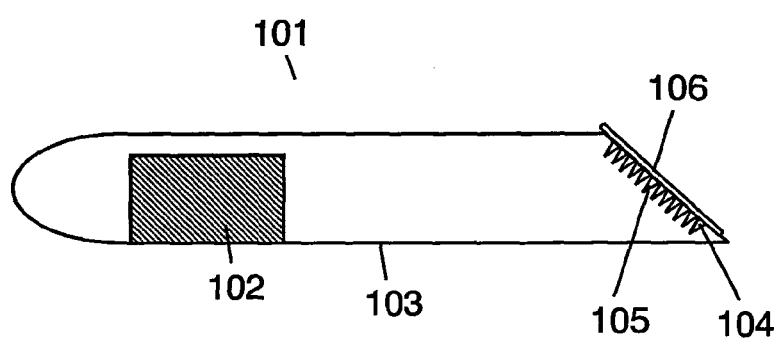
FIG. 9 is a sectional view of the gas adsorbing device after switching in accordance with the fourth exemplary embodiment.

FIG. 9 is a sectional view of gas adsorbing device 101 after switching in accordance with the fourth exemplary embodiment of the present invention.

Regarding gas adsorbing device 101 having such a structure, operations and actions are described hereinafter.

Since gas adsorbent 102 is sealed with film 112 having polyethylene and gas barrier property, gas adsorbent 102 does not come into contact with gas even when gas adsorbing device 101 is left in the atmosphere for a long time. Therefore, gas adsorbent 102 does not degrade and can be held in the atmosphere for a long time.

When gas adsorbing device 101 is applied to a vacuum heat insulator, through holes are drilled in film 112, and gas adsorbent 102 communicates with the space inside the jacket material of the vacuum heat insulator.

The operation of gas adsorbing device 101 in preparing the vacuum heat insulator in the present embodiment is the same as that in the first embodiment.

Container 103 of the present embodiment is easily processed in terms of the shape, and the cost can be kept low.

Specific contents of gas adsorbing device 101 of these embodiments are described hereinafter in examples 1 through 3.

Results using specification having different condition are described in comparative examples.

EXAMPLE 1

Gas adsorbent 102 is made of powdery CuZSM-5.

Container 103 is a bag that is prepared by depositing a part of low-density polyethylene with another part thereof in laminated film that is made of 50 μm-thick low-density polyethylene, 7 μm-thick aluminum foil, and 25 μm-thick polyethylene terephthalate film.

Protrusions 104 and plate-like member 106 are made of iron and integrally molded. The shape of plate-like member 106 is a square 1 cm on a side. The number of protrusions 104 is 25, the shape of each protrusion is a conical shape, and the bottom face of the cone matches with the surface of the plate-like member. The distance between the tips of protruding portions 105 and plate-like member 106 is 5 mm.

Container 103 is decompressed and sealed after gas adsorbent 102 is filled into it, and the distance between a surface of the laminated film and the opposite surface thereof is 10 mm.

Gas adsorbing device 101 having this structure is applied to the vacuum heat insulator, and the evaluation is performed.

As a core material, a plate-like object formed by thermally molding an aggregate of glass staple fibers is used. The core material, together with gas adsorbing device 101, is inserted into the jacket material whose three sides are previously sealed. The jacket material is installed in a vacuum chamber, decompressed to 100 Pa, and sealed. When the atmosphere is introduced into the vacuum chamber, gas adsorbing device 101 is changed by the atmospheric pressure, and the gas inside the jacket material can be adsorbed. According to measurement of the pressure inside the vacuum heat insulator, the pressure is 5 Pa, and the pressure inside the jacket material is reduced by adsorption by the gas adsorbent. The length of the protrusions is shorter than the thickness of the container, so that the jacket material is not damaged.

The inner pressure after the vacuum heat insulator is held in the atmosphere for one month is 5 Pa, and it is verified that the gas infiltrating through the jacket material is adsorbed.

EXAMPLE 2

Gas adsorbent 102 is made of powdery CuZSM-5.

Container 103 is a polyethylene-made box body, the width is 30 mm, the depth is 20 mm, the height is 10 mm, and one face of 30 mm×20 mm is chipped. Film 112 having gas barrier property is a laminated film of 50 μm-thick low-density polyethylene, 7 μm-thick aluminum foil, and 25 μm-thick nylon film.

Protrusions 104 and plate-like member 106 are made of iron and integrally molded. The shape of plate-like member 106 is a square 1 cm on a side. The number of protrusions 104 is 25, the shape of each protrusion is a conical shape, and the bottom face of the cone matches with the surface of the plate-like member 106. The distance between the tips of protruding portions 105 and plate-like member 106 is 5 mm.

In a chamber having argon gas atmosphere, powdery CuZSM-5 is filled into container 103, container 103 is decompressed, the chipped part is covered with film 112 having gas barrier property and sealed by thermal deposition.

After the atmosphere is introduced into the chamber, the inside thereof is compressed by the atmospheric pressure, and hence the film 112 part becomes thin. The thickness of the thinnest part is 7 mm.

Gas adsorbing device 101 having this structure is applied to the vacuum heat insulator, and the evaluation is performed.

As a core material, a plate-like object formed by thermally molding an aggregate of glass staple fibers is used. The core material, together with gas adsorbing device 101, is inserted into the jacket material whose three sides are previously sealed. The jacket material is installed in a vacuum chamber, decompressed to 100 Pa, and sealed. When the atmosphere is introduced into the vacuum chamber, gas adsorbing device 101 is changed by the atmospheric pressure, and the gas inside the jacket material of the vacuum heat insulator can be adsorbed. According to measurement of the pressure inside the vacuum heat insulator, the pressure is 5 Pa, and the pressure inside the jacket material is reduced by adsorption by gas adsorbent 102. The length of protrusions 104 is shorter than the thickness of container 103, so that the jacket material is not damaged.

The inner pressure after the vacuum heat insulator is held in the atmosphere for one month is 5 Pa, and it is verified that the gas infiltrating through the jacket material is adsorbed.

EXAMPLE 3

Gas adsorbent 102 is made of powdery CuZSM-5.

Container 103 is a polyethylene-made box body, the width is 30 mm, the depth is 20 mm, the height is 10 mm, and one face of 30 mm×20 mm has 10 mm-diameter opening 110.

Protrusions 104 and plate-like member 106 are made of iron and integrally molded. The shape of plate-like member 106 is a square 1 cm on a side. The number of protrusions 104 is 25, the shape of each protrusion is a conical shape, and the bottom face of the cone matches with the surface of plate-like member 106. The distance between the tips of protruding portions 105 and plate-like member 106 is 5 mm.

In a chamber having argon gas atmosphere, powdery CuZSM-5 is filled into container 103, container 103 is decompressed, opening 110 is sealed with butyl rubber plug 111.

After the atmosphere is introduced into the chamber, the inside thereof is compressed by the atmospheric pressure. The thickness of the thinnest part of container 103 including butyl rubber plug 111 is 8 mm.

Gas adsorbing device 101 having this structure is applied to the vacuum heat insulator, and the evaluation is performed.

As a core material, a plate-like object formed by thermally molding an aggregate of glass staple fibers is used. The core material, together with gas adsorbing device 101, is inserted into the jacket material whose three sides are previously sealed. The jacket material is installed in a vacuum chamber, decompressed to 100 Pa, and sealed. When the atmosphere is introduced into the vacuum chamber, gas adsorbing device 101 is changed by the atmospheric pressure, and the gas inside the jacket material of the vacuum heat insulator can be adsorbed. According to measurement of the pressure inside the vacuum heat insulator, the pressure is 5 Pa, and the pressure inside the jacket material is reduced by adsorption by gas adsorbent 102. The length of protrusions 104 is shorter than the thickness of container 103, so that the jacket material is not damaged.

The inner pressure after the vacuum heat insulator is held in the atmosphere for one month is 5 Pa, and it is verified that the gas infiltrating through the jacket material is adsorbed.

COMPARATIVE EXAMPLE 1

A vacuum heat insulator is prepared using a gas adsorbing device described in Japanese Translation of PCT Publication No. H09-512088. The condition for preparing the vacuum heat insulator is equivalent to that of example 1. The gas adsorbing device described in Japanese Translation of PCT Publication No. H09-512088 has a structure where Ba—Li is filled into a metal container having an opening and the opening is covered with calcium oxide. The pressure inside the prepared vacuum heat insulator is 100 Pa according to measurement. This result shows that Ba—Li does not adsorb the gas inside the vacuum heat insulator. There are following reasons. In the gas adsorbing device of comparative example 1, the gas barrier property by calcium oxide is insufficient, and hence Ba—Li adsorbs gas and degrades during preparing the vacuum heat insulator.

COMPARATIVE EXAMPLE 2

A vacuum heat insulator is prepared using a gas adsorbing device where CuZSM-5 is previously filled into a bag made of non-woven fabric. The condition for preparing the vacuum heat insulator is equivalent to that of example 1. The pressure inside the vacuum heat insulator is 100 Pa according to measurement. This result shows that CuZSM-5 does not adsorb the gas inside the vacuum heat insulator. That is because the gas permeability of the non-woven fabric is large and hence CuZSM-5 adsorbs gas and degrades during preparing the vacuum heat insulator.

The gas adsorbing device of the present invention has a container including an opening, a partition for blocking the opening, and a gas adsorbent and gas that is not adsorbed by the gas adsorbent in the closed space surrounded by the container and the partition. The gas pressure inside the closed space is lower than the atmospheric pressure.

The atmospheric pressure means gas pressure in an ambient atmosphere where the gas adsorbing device is held or an ambient atmosphere where work for installing the gas adsorbing device in a vacuum apparatus is performed. It is considered that the atmospheric pressure is about 1013 hPa at about 0 m above sea level, but is lower than 1013 hPa at high altitude above sea level or in an aircraft. The atmospheric pressure somewhat varies in response to the weather condition such as cyclone or anticyclone even at about 0 m above sea level.

When the gas pressure inside the closed space is lower—even slightly—than the atmospheric pressure, this gas adsorbing device can be used. When an impact is applied from the outside during holding of the gas adsorbing device or in installing it in the vacuum apparatus, however, the partition separates from the container in the atmosphere and the gas adsorbent degrades.

It is preferable that the force for pressing the partition to the container is stronger, the gas pressure in the closed space is 500 hPa or lower, and more preferably the gas pressure is 300 hPa or lower.

The closed space is a space that does not communicate with other space without passing an object having a certain shape. The closed space is, for example, the inside of a spherical shell.

The partition defines the closed space in the following manner. The partition has the same size and shape as those of the opening of the container and a clearance does not occur between the partition and the opening of the container, or the partition is larger than the opening of the container and the opening is completely covered with the partition.

The pressure of the gas is applied to a surface of a material when the surface is in contact with the gas. The pressure is applied from many directions. Therefore, when the material is placed in a uniform pressure atmosphere, total force from the gas is zero and no net force is applied to the material.

When the pressure of the gas that is in contact with the material is not uniform, total force from the gas is not zero and a net force is applied to the material. For instance, when gas pressure applied to one surface of the plate-like material is different from gas pressure applied to the other surface thereof, force of the direction from the higher-pressure surface to the lower-pressure surface occurs in the plate-like material.

Thanks of the above-mentioned physical mechanism, discontinuity between the gas adsorbent and the external space is switched to continuity between them in the gas adsorbing device. The switching from the discontinuity to the continuity in the gas adsorbing device in installing the gas adsorbing device in the vacuum apparatus is described in detail.

First, in the gas adsorbing device, the gas that is not adsorbed by the gas adsorbent is filled in the closed space, and the gas pressure is lower than the atmospheric pressure.

Therefore, the partition receives force for pressing the opening in the container from the atmosphere, and hence suppresses gas flow between the inside and outside of the container.

Next, the inside of the vacuum apparatus having the gas adsorbing device is decompressed. When the pressure inside the closed space of the gas adsorbing device equals to the pressure outside it, the force for pressing the partition to the container does not work, and the partition separates from the container. Thus, the gas adsorbent communicates with the external space of the gas adsorbing device, and the gas adsorbent can be made to work.

In the gas adsorbing device of the present invention, both the container and partition are gas hardly-permeable.

The gas hardly-permeability means that the gas permeability as property intrinsic to material is small, and the gas permeability of the container and partition made of the material is $10^4$ [$cm^3/m^2$-day-atm] or lower, more preferably $10^3$ [$cm^3/m^2$-day-atm] or lower.

Specifically, an example of the material is a metal group such as copper, iron or aluminum, or a plastic group such as ethylene-vinylalcohol copolymer, polyacrylonitrile, nylon 6, nylon 66, nylon 12, polybutylene terephthalate, polybutylene naphthalate, polyethylene terephthalate, polyethylene naphthalate, polyvinylidene fluoride, polyvinylidene chloride, ethylene-tetrafluoroethylene copolymer, polytetrafluoroethylene, polyimide, polycarbonate, polyacetate, polystyrene, acrylonitrile butadiene styrene (ABS), polypropylene, or polyethylene. The present invention is not limited to these.

Since both the container and partition are gas hardly-permeable, even when the gas adsorbing device is in an atmosphere containing gas adsorbed by the gas adsorbent, the gas adsorbed by the gas adsorbent infiltrates through the container only a little. The degradation of the gas adsorbent can be suppressed.

In the gas adsorbing device of the present invention, at least a part of at least one of the container and partition is an elastic body.

When the elastic body deforms substantially proportionally to the stress from the outside and the stress does not work, the elastic body returns to a normal state under no stress. An example of the elastic body is rubber.

Since at least a part of at least one of the container and partition is an elastic body, even when the opening of the container and the partition have different shapes in a state under no pressure, the container and the partition are deformed by pressure to improve the sealing property.

Therefore, even when the gas adsorbing device is in an atmosphere containing gas adsorbed by the gas adsorbent, the degradation of the gas adsorbent due to infiltration of gas from the outside of the gas adsorbing device can be suppressed.

Metal and plastics are considered to be elastic bodies in a broad sense because they elastically deform with slight distortion, but other material having a large ratio of distortion to stress is more preferable.

The gas adsorbing device receives an external force during handling until it is installed in the vacuum apparatus. Therefore, it is preferable that the deformation due to distortion is small in the container, and it is more preferable that the partition is an elastic body.

In the gas adsorbing device of the present invention, the gas adsorbent is covered with a gas-permeable packaging material.

The gas permeability of the gas-permeable packaging material is $10^8$ [$cm^3/m^2$-day-atm] or higher, and preferably $10^{10}$ [$cm^3/m^2$-day-atm] or higher.

The packaging material is a film or sheet formed by braiding fibers or collecting them with a binder. The packaging material is a continuous body from a macro viewpoint, but has an infinite number of opening through holes from a micro viewpoint.

The packaging material may be molded in a bag shape, and may include a gas adsorbent. The form of the bag may be a pillow bag or a gazette bag, but the present invention is not limited to these. All sides of the packaging material do not need to be closed, and some sides may be opened.

The flow speed of gas between the inside and outside of the container varies dependently on a producing condition of the gas adsorbing device or a decompressing condition set when the gas adsorbing device is installed in the vacuum apparatus. When the speed is high, the gas adsorbent, if powdery, can be scattered by rapid gas flow. However, the scattering of the gas adsorbent can be suppressed by making the through holes in the packaging material smaller than the grain size of the gas adsorbent. When the packaging material has an opening side, the opening side is preferably set in the direction opposite to the opening of the container.

Since the gas permeability of the packaging material is extremely large, the packaging material does not disturb the continuity of the space through which gas permeates, and the adsorbing characteristic of the gas adsorbing device does not degrade.

As the gas-permeable packaging material, non-woven fabric, gauze, wire mesh, or the like is used, but the present invention is not limited to these. The packaging material is any material as long as it is a continuous body from a macro viewpoint and has many opening through holes from a micro viewpoint.

The gas adsorbing device of the present invention has a gas-permeable divider between the opening of the container and the gas adsorbent.

The gas permeability of the gas-permeable divider is $10^8$ [$cm^3/m^2$-day-atm] or higher, and preferably $10^{10}$ [$cm^3/m^2$-day-atm] or higher.

The divider divides space into a plurality of parts from a macro viewpoint, and is spatially continuous and has gas permeability from a micro viewpoint.

The divider is installed between the gas adsorbent and the opening of the container and is in contact with the inner wall of the container.

The flow speed of gas between the inside and outside of the container when the partition separates from the container varies dependently on a producing condition of the gas adsorbing device or a decompressing condition set when the gas adsorbing device is installed in the vacuum apparatus. When the flow speed of gas is high, rapid gas flow occurs in the container of the gas adsorbing device. When the gas adsorbent is powdery, the gas adsorbent can be scattered by the rapidly coming gas. However, the scattering of the gas adsorbent can be suppressed by making the through holes in the divider smaller than the grain size of the gas adsorbent.

Since the gas permeability of the divider is extremely large, the divider does not disturb the continuity of the space through which gas permeates, and the adsorbing characteristic of the gas adsorbing device does not degrade.

As the gas-permeable divider, glass wool, foam of plastics, non-woven fabric, wire mesh, or the like is used, but the present invention is not limited to these. The divider is any material as long as it is a continuous body from a macro viewpoint and has many opening through holes from a micro viewpoint.

In the gas adsorbing device of the present invention, the container is covered with a gas hardly-permeable covering material.

When the inside of the covering material is filled with gas that is not adsorbed by the gas adsorbent, the external space of the container is filled with the gas that is not adsorbed by the gas adsorbent. Therefore, even when a slight clearance exists between the inner wall of the container and the partition and gas flows between the closed space formed of the inner wall and partition and the external space of the container, the gas adsorbent does not degrade. Therefore, the gas adsorbing device can be left in the atmosphere for a long time.

The gas hardly-permeable covering material means a covering material whose gas permeability is $10^4$ [$cm^3/m^2$-day-atm] or lower, and preferably $10^2$ [$cm^3/m^2$-day-atm] or lower.

Specifically, the covering material is prepared by forming, in a bag shape, a film or sheet of plastics such as ethylene-vinylalcohol copolymer, nylon, polyethylene terephthalate, or polypropylene. However, the present invention is not limited to these. Preferably, the gas barrier property is increased by sticking metal foil to the plastic film or evaporating metal onto it. Metal applicable to the metal foil or evaporation can be gold, copper, or aluminum, but the present invention is not limited to these. The gas permeability is a value intrinsic to material and does not always satisfy the above-mentioned conditions as the covering material, so that the thickness thereof is made appropriate so as to satisfy the above-mentioned conditions as the covering material.

Embodiments of the present invention will be described hereinafter with reference to the accompanying drawings. The present invention is not limited by these embodiments.

(Fifth Exemplary Embodiment)

Figure 10:
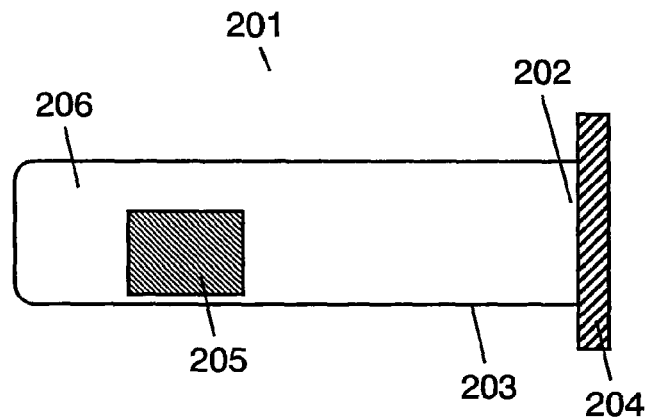
FIG. 10 is a sectional view of a gas adsorbing device at atmospheric pressure in accordance with a fifth exemplary embodiment of the present invention.
Figure 11:
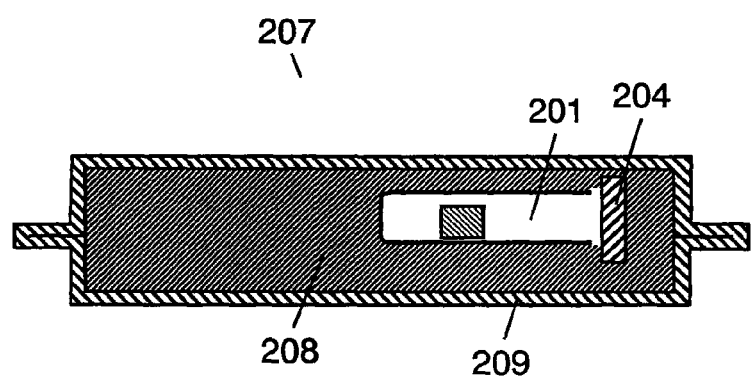
FIG. 11 is a sectional view of a vacuum heat insulator employing the gas adsorbing device in accordance with the fifth exemplary embodiment.
Figure 12:
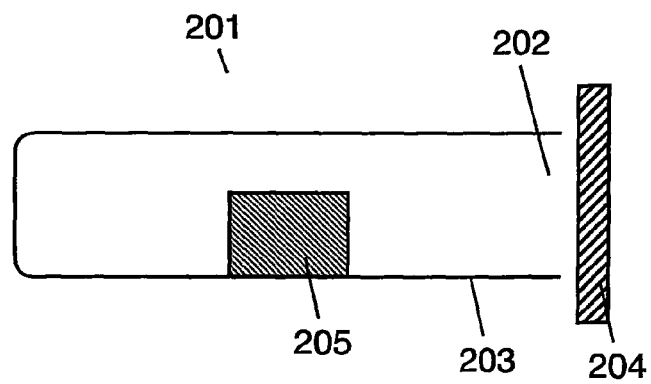
FIG. 12 is a sectional view of the gas adsorbing device under decompression in accordance with the fifth exemplary embodiment.

FIG. 10 is a sectional view of gas adsorbing device 201 at atmospheric pressure in accordance with a fifth exemplary embodiment of the present invention. FIG. 11 is a sectional view of vacuum heat insulator 207 employing gas adsorbing device 201 in accordance with the fifth exemplary embodiment. FIG. 12 is a sectional view of gas adsorbing device 201 under decompression in accordance with the fifth exemplary embodiment.

As shown in FIG. 10, gas adsorbing device 201 has the following elements:
container 203 including opening 202;
rubber-made partition 204 for blocking opening 202; and
gas adsorbent 205 made of CuZSM-5 type zeolite and non-adsorbent gas 206 that is not adsorbed by gas adsorbent 205 in the closed space surrounded by container 203 and partition 204.

The gas pressure inside the closed space is lower than the atmospheric pressure.

As shown in FIG. 11, in vacuum heat insulator 207, gas adsorbing device 201 and core material 208 are covered with jacket material 209, and the inside of jacket material 209 is decompressed and sealed.

Operations and actions when gas adsorbing device 201 having such a structure is applied to vacuum heat insulator 207 are described hereinafter.

As shown in FIG. 10, non-adsorbent gas 206 is filled into the closed space formed of container 203 and partition 204, and the pressure of non-adsorbent gas 206 is lower than the atmospheric pressure. Since the atmospheric pressure is higher than the pressure inside container 203, partition 204 is pressed to opening 202 of container 203 with the pressure equivalent to the pressure difference between the atmospheric pressure and the pressure inside container 203. Since partition 204 is made of rubber, partition 204 is deformed and fast stuck to opening 202 when being pressed to opening 202.

Thus, the closed space is formed of container 203 and partition 204, infiltration of air into container 203 is suppressed, and the degradation of gas adsorbent 205 can be suppressed during holding gas adsorbing device 201.

When gas adsorbent 205 is installed inside vacuum heat insulator 207, gas adsorbent 205 adsorbs the gas inside vacuum heat insulator 207, so that gas adsorbent 205 is required to communicate with the external space of container 203. This is achieved in the following process.

When gas adsorbing device 201 is placed at the atmospheric pressure, the pressure inside container 203 is lower than the atmospheric pressure, so that partition 204 is pressed to container 203 from the outside.

Gas adsorbing device 201 is installed inside jacket material 209 of vacuum heat insulator 207 and then the inside of jacket material 209 is decompressed, thereby decreasing the pressure difference between the inside and outside of container 203. When decompression is further performed, the pressure difference between the inside and outside of container 203 drops out, and the force for pressing partition 204 to container 203 does not work. Therefore, partition 204 separates from the container 203.

As shown in FIG. 12, when partition 204 separates from the container 203, gas adsorbent 205 communicates with the external space of gas adsorbing device 201 through opening 202 and the adsorption of gas is allowed.

As discussed above, partition 204 separates from container 203 just when the pressure outside container 203 becomes equal to the pressure inside it. Therefore, in preparing gas adsorbing device 201, the pressure at which partition 204 separates from container 203 can be arbitrarily controlled by controlling the pressure of the non-adsorbent gas filled into container 203.

Vacuum heat insulator 207 is prepared by inserting gas adsorbing device 201 and core material 208 into jacket material 209 that is previously formed in a bag shape by sealing three sides, installing jacket material 209 in a vacuum chamber and decompressing it, then sealing a non-sealed part of jacket material 209 by thermal deposition.

(Sixth Exemplary Embodiment)

Figure 13:
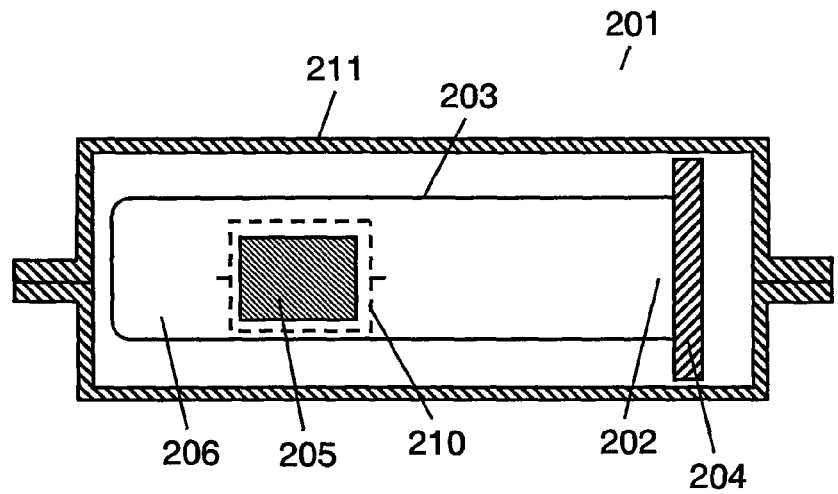
FIG. 13 is a sectional view of a gas adsorbing device in accordance with a sixth exemplary embodiment of the present invention.

FIG. 13 is a sectional view of gas adsorbing device 201 in accordance with a sixth exemplary embodiment of the present invention.

As shown in FIG. 13, in gas adsorbing device 201, gas adsorbent 205 is covered with packaging material 210, and container 203 is covered with covering material 211. In FIG. 13, packaging material 210 is made of non-woven fabric. Covering material 211 is prepared by thermally depositing a plastic laminated film. A part of low-density polyethylene of a laminated film is faced to the other part thereof, and four sides are thermally deposited, thereby separating the space inside covering material 211 from the space outside it. Here, the laminated film is formed by stacking the low-density polyethylene, aluminum foil, and nylon in that order.

Since covering material 211 includes aluminum foil, the gas permeability is extremely small, and the amount of the gas infiltrating into covering material 211 is extremely small. Even when gas adsorbing device 201 is left in the atmosphere for a long time, gas adsorbent 205 hardly degrades and the essential adsorbing characteristic can be obtained.

When the inside of container 203 is decompressed, the gas around gas adsorbent 205 is discharged to the inside of container 203 through packaging material 210. When the discharge speed is high, gas adsorbent 205 can scatter disadvantageously. However, gas adsorbent 205 remains inside packaging material 210 and hence does not scatter.

When gas adsorbing device 201 is applied to vacuum heat insulator 207, gas adsorbent 205 does not scatter inside packaging material 210 and vacuum heat insulator 207 can be easily recycled.

For reproducing the function of gas adsorbing device 201 of the present embodiment, covering material 211 is broken and removed before using it. The operation of gas adsorbing device 201 under decompression is similar to that of the fifth exemplary embodiment.

(Seventh Exemplary Embodiment)

Figure 14:
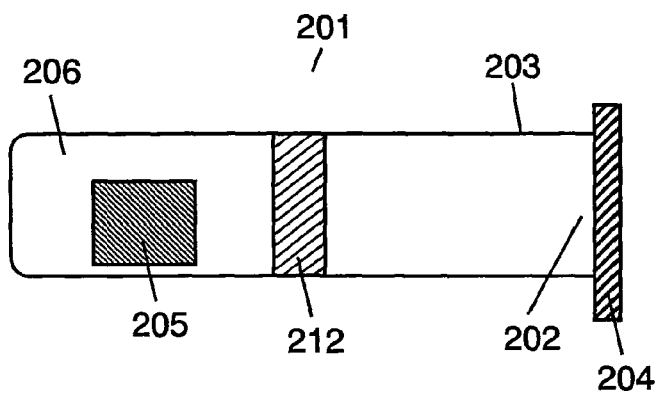
FIG. 14 is a sectional view of a gas adsorbing device in accordance with a seventh exemplary embodiment of the present invention.

FIG. 14 is a sectional view of gas adsorbing device 201 in accordance with a seventh exemplary embodiment of the present invention.

As shown in FIG. 14, in gas adsorbing device 201, divider 212 is installed between gas adsorbent 205 and partition 204. Divider 212 is made of glass wool.

When the inside of container 203 is decompressed, the gas around gas adsorbent 205 is discharged to the outside of container 203 through divider 212. When the discharge speed is high, gas adsorbent 205 can scatter disadvantageously. However, gas adsorbent 205 remains inside divider 212 and hence does not scatter.

When gas adsorbing device 201 is applied to vacuum heat insulator 207, gas adsorbent 205 does not scatter inside container 203 and vacuum heat insulator 207 can be easily recycled.

The operation of gas adsorbing device 201 under decompression is similar to that of the fifth exemplary embodiment.

Specific contents of gas adsorbing devices 201 of these exemplary embodiments are described in examples 4 through 6.

EXAMPLE 4

A glass bottle with an internal volume of 10 ml is used as container 203. A circular rubber plate is used as partition 204. CuZSM-5 type zeolite is used as gas adsorbent 205, and Ar gas is used as the non-adsorbent gas. The diameter of the opening of the glass bottle is 10 mm, and the diameter of the rubber plate is 15 mm. The center of opening 202 of container 203 is aligned to the center of the rubber plate, thereby preparing gas adsorbing device 201. Ar gas is filled so that the pressure becomes 500 hPa. Prepared gas adsorbing devices 201 is installed in a vacuum chamber, and its operation is verified.

When the inside of the vacuum chamber is decompressed to 500 hPa, partition 204 separates from container 203. Thus, the pressure when partition 204 separates from container 203 is the same as that inside container 203. The pressure at which gas adsorbent 205 communicates with the external atmosphere can be arbitrarily controlled by adjusting the pressure inside container 203.

For evaluating the force for pressing partition 204 and container 203 while gas adsorbent 205 is held in the atmosphere, tensile strength of container 203 and partition 204 is measured at atmospheric pressure. The tensile direction is perpendicular to the surface direction of partition 204.

The tensile strength of container 203 and partition 204 is 4.08 N. This value is derived by multiplying the area of opening 202 by the pressure difference between the inside and outside of container 203.

EXAMPLE 5

The operation of gas adsorbing device 201 where the pressure inside container 203 is 300 hPa is verified. Gas adsorbing device 201 is installed inside the vacuum chamber, and decompressed. When the inside of the vacuum chamber reaches 300 hPa, container 203 separates from partition 204.

EXAMPLE 6

In the present example, container 203 is covered with laminated covering material 211 formed by stacking nylon, aluminum foil, and polyethylene terephthalate in that order. When the adsorbing characteristic of gas adsorbent 205 is evaluated after a lapse of one month since gas adsorbing device 201 is prepared, the degradation of the adsorbing capability is not recognized. That is because container 203 is covered with covering material 211 to prevent gas from infiltrating into container 203.

The gas adsorbing device of the present invention has a container that has an opening at one end and is at least partially cylindrical, a partition that is in contact with the cylindrical inner wall of the container, and a gas adsorbent and gas that is not adsorbed by the gas adsorbent that are filled in the closed space surrounded by the container and the partition.

The cylindrical shape is a shape where sectional areas and sectional shapes in a plurality of places are substantially the same, and corresponds to a column, triangle pole, or square pole, for example. The sectional shape is not limited to these, but may be rhomboid, parallelogram, trapezoid, pentagon, or ellipse.

The gas that is not adsorbed by the gas adsorbent is gas that the gas adsorbent cannot adsorb or hardly adsorb. When the gas adsorbent can adsorb only nitrogen or oxygen, the non-adsorbent gas is inert gas or the like such as argon gas.

The partition is in contact with the cylindrical inner wall of the at least partially cylindrical container, and a closed space is formed of the container and partition.

The closed space is a space that does not communicate with other space without passing an object having a certain shape. The closed space is, for example, the inside of a spherical shell.

The partition is preferably prepared so that its size and shape are the same as those of the inner wall of the cylindrical part of the container and a clearance does not occur between the inner wall of the cylindrical part and the partition. In industrial production, however, it is difficult that the size and shape of the partition are made exactly the same as those of the inner wall of the cylindrical part of the container. Therefore, it is preferable that the partition is slightly larger than the inner wall of the cylindrical part, the inner wall is fast stuck to the partition by deformation of one of them, and the sealing property of the closed space is secured.

Since the gas that is not adsorbed by the gas adsorbent is filled in the closed space, infiltration of the gas of the atmosphere where the gas adsorbing device is placed is suppressed. Therefore, the gas adsorbent does not come into contact with the gas of the atmosphere where the gas adsorbing device is placed, so that the gas adsorbent does not degrade even when work of installing the gas adsorbing device in the vacuum apparatus in the atmosphere of about 1 atm pressure is performed. In the vacuum apparatus, the gas adsorbent is required to come into contact with the atmosphere where the gas adsorbing device is placed. This is achieved by the following mechanism.

When the gas adsorbing device is installed in the vacuum apparatus and then the inside of the vacuum apparatus is decompressed, the non-adsorbent gas existing in the closed space formed of the container and partition expands. The partition is moved toward the opening of the cylindrical part by the pressure generated by the expansion, the cylindrical part of the container separates from the partition, and the gas adsorbent communicates with the internal space of the vacuum apparatus. The inside of the vacuum apparatus has been decompressed at the time when the cylindrical container separates from the partition. Therefore, the gas adsorbent can adsorb the residual gas in the vacuum apparatus without coming into contact with the atmosphere of about 1 atm pressure.

In the gas adsorbing device of the present invention, both the cylindrical part and non-cylindrical part are gas hardly-permeable.

The gas hardly-permeability means that the gas permeability as property intrinsic to material is small, and the gas permeability of the container made of the material is $10^4$ [$cm^3/m^2$-day-atm] or lower, more preferably $10^3$ [$cm^3/m^2$-day-atm] or lower.

Specifically, an example of the material is a metal group such as copper, iron or aluminum, or a plastic group such as ethylene-vinylalcohol copolymer, polyacrylonitrile, nylon 6, nylon 66, nylon 12, polybutylene terephthalate, polybutylene naphthalate, polyethylene terephthalate, polyethylene naphthalate, polyvinylidene fluoride, polyvinylidene chloride, ethylene-tetrafluoroethylene copolymer, polytetrafluoroethylene, polyimide, polycarbonate, polyacetate, polystyrene, ABS, polypropylene, or polyethylene. The present invention is not limited to these.

Since both the cylindrical part and the non-cylindrical part of the container are gas hardly-permeable, even when the gas adsorbing device is in an atmosphere containing gas adsorbed by the gas adsorbent, the gas adsorbed by the gas adsorbent infiltrates through the container only a little. The degradation of the gas adsorbent can be therefore suppressed.

In the gas adsorbing device of the present invention, the partition is gas hardly-permeable.

The gas hardly-permeability means that the gas permeability as property intrinsic to material is small, and the gas permeability of the partition made of the material is $10^4$ [$cm^3/m^2$-day-atm] or lower, more preferably $10^3$ [$cm^3/m^2$-day-atm] or lower.

Specifically, an example of the material is a metal group such as copper, iron or aluminum, or a plastic group such as ethylene-vinylalcohol copolymer, polyacrylonitrile, nylon 6, nylon 66, nylon 12, polybutylene terephthalate, polybutylene naphthalate, polyethylene terephthalate, polyethylene naphthalate, polyvinylidene fluoride, polyvinylidene chloride, ethylene-tetrafluoroethylene copolymer, polytetrafluoroethylene, polyimide, polycarbonate, polyacetate, polystyrene, ABS, polypropylene, or polyethylene. The present invention is not limited to these.

Since the partition is gas hardly-permeable, even when the gas adsorbing device is in an atmosphere containing gas adsorbed by the gas adsorbent, the gas adsorbed by the gas adsorbent infiltrates through the container only a little. The degradation of the gas adsorbent can be therefore suppressed.

In the gas adsorbing device of the present invention, at least a part of at least one of the cylindrical part of the container and the partition is an elastic body.

When the elastic body deforms substantially proportionally to the stress from the outside and the stress does not work, the elastic body returns to a normal state under no stress. An example of the elastic body is rubber.

At least a part of at least one of the cylindrical part of the container and the partition is an elastic body, as discussed above. Therefore, when the partition slightly larger than the sectional area of the cylindrical inner wall is disposed on the cylindrical inner wall, one of the cylindrical part and the partition deforms to eliminate the clearance between the cylindrical part and the partition, thereby improving the sealing property.

Therefore, even when the gas adsorbing device is in an atmosphere containing gas adsorbed by the gas adsorbent, the degradation of the gas adsorbent due to infiltration of gas from the outside of the gas adsorbing device can be suppressed.

Metal and plastics are considered to be elastic bodies in a broad sense because they elastically deform with slight distortion, but other material having a large ratio of distortion to stress is more preferable.

The gas adsorbing device receives an external force during handling until it is installed in the vacuum apparatus. Therefore, it is preferable that the deformation due to distortion is small in the container, and it is more preferable that the partition is an elastic body.

In the gas adsorbing device of the present invention, the gas adsorbent is covered with a gas-permeable packaging material.

The gas permeability of the gas-permeable packaging material is $10^8$ [$cm^3/m^2$-day-atm] or higher, and preferably $10^{10}$ [$cm^3/m^2$-day-atm] or higher.

The packaging material is a film or sheet formed by braiding fibers or collecting them with a binder. The packaging material is a continuous body from a macro viewpoint, but has an infinite number of opening through holes from a micro viewpoint.

The packaging material may be molded in a bag shape, and may include a gas adsorbent. The form of the bag may be a pillow bag or a gazette bag, but the present invention is not limited to these. All sides of the packaging material do not need to be closed, and some sides may be opened.

The pressure at which the partition separates from the cylindrical part of the container varies dependently on a producing condition of the gas adsorbing device or a decompressing condition set when the gas adsorbing device is installed in the vacuum apparatus. When the pressure is high, gas rapidly joins between the external space of the gas adsorbing device and the cylindrical container. When the gas adsorbent is powdery, the gas adsorbent can be scattered by the rapidly joining gas. However, the scattering of the gas adsorbent can be suppressed by making the through holes in the packaging material smaller than the grain size of the gas adsorbent. When the packaging material has an opening side, the opening side is preferably set in the direction opposite to the opening of the cylindrical container.

Since the gas permeability of the packaging material is extremely large, the packaging material does not disturb the continuity of the space through which gas permeates, and the adsorbing characteristic of the gas adsorbing device does not degrade.

As the gas-permeable packaging material, non-woven fabric, gauze, wire mesh, or the like is used, but the present invention is not limited to these. The packaging material is any material as long as it is a continuous body from a macro viewpoint and has many opening through holes from a micro viewpoint.

The gas adsorbing device of the present invention has a gas-permeable divider between the partition and the gas adsorbent.

The gas permeability of the gas-permeable divider is $10^8$ [$cm^3/m^2$-day-atm] or higher, and preferably $10^{10}$ [$cm^3/m^2$-day-atm] or higher.

The divider divides space into a plurality of parts from a macro viewpoint, and is spatially continuous and has gas permeability from a micro viewpoint.

The divider is installed between the gas adsorbent and the opening of the cylindrical container and is in contact with the inner wall of the cylindrical container.

The atmosphere pressure at which the partition separates from the cylindrical part of the container varies dependently on the producing condition of the gas adsorbing device or the decompressing condition set when the gas adsorbing device is installed in the vacuum apparatus. When the pressure is high, gas rapidly joins between the external space of the gas adsorbing device and the cylindrical container. When the gas adsorbent is powdery, the gas adsorbent can be scattered by the rapidly joining gas. However, the scattering of the gas adsorbent can be suppressed by making the through holes in the divider smaller than the grain size of the gas adsorbent.

Since the gas permeability of the divider is extremely large, the divider does not disturb the continuity of the space through which gas permeates, and the adsorbing characteristic of the gas adsorbing device does not degrade.

As the gas-permeable divider, glass wool, foam of plastics, non-woven fabric, wire mesh, or the like is used, but the present invention is not limited to these. The divider is any material as long as it is a continuous body from a macro viewpoint and has many opening through holes from a micro viewpoint.

In the gas adsorbing device of the present invention, the container is covered with a gas hardly-permeable covering material.

When the inside of the covering material is filled with gas that is not adsorbed by the gas adsorbent, the external space of the cylindrical part of the container is filled with the gas that is not adsorbed by the gas adsorbent. Therefore, even when a slight clearance exists between the inner wall of the cylindrical part of the container and the partition and gas flows between the closed space formed of them and the external space of the cylindrical part, the gas adsorbent does not degrade. Therefore, the gas adsorbing device can be left in the atmosphere for a long time.

The gas hardly-permeable covering material means a covering material whose gas permeability is $10^4$ [$cm^3/m^2$-day-atm] or lower, and preferably $10^2$ [$cm^3/m^2$-day-atm] or lower.

Specifically, the covering material is prepared by forming, in a bag shape, a film or sheet of plastics such as ethylene-vinylalcohol copolymer, nylon, polyethylene terephthalate, or polypropylene. However, the present invention is not limited to these. Preferably, the gas barrier property is increased by sticking metal foil to the plastic film or evaporating metal onto it. Metal applicable to the metal foil or evaporation can be gold, copper, or aluminum, but the present invention is not limited to these. The gas permeability is a value intrinsic to material and does not always satisfy the above-mentioned conditions as the covering material. In this case, the thickness thereof is made appropriate so as to satisfy the above-mentioned conditions as the covering material.

In the gas adsorbing device of the present invention, the opening of the container is sealed with a gas hardly-permeable film.

When the space between the film and the partition is filled with gas that is not adsorbed by the gas adsorbent, the external space of the partition is filled with the non-adsorbent gas. Therefore, even when a slight clearance exists between the inner wall of the cylindrical part of the container and the partition and gas flows between the closed space formed of them and the space between the partition and the film, the gas adsorbent does not degrade. Therefore, the gas adsorbing device can be left in the atmosphere for a long time.

The gas hardly-permeable film is formed by molding metal or plastics into a thin shape, and is a covering material whose gas permeability is $10^4$ [cm$^3$/m$^2$-day-atm] or lower, and preferably $10^2$ [cm$^3$/m$^2$-day-atm] or lower.

Specifically, the film is made of plastics such as ethylene-vinylalcohol copolymer, nylon, polyethylene terephthalate, or polypropylene. However, the present invention is not limited to these. Preferably, the gas barrier property is increased by sticking metal foil to the plastic film or evaporating metal onto it. Metal applicable to the metal foil or evaporation can be gold, copper, or aluminum, but the present invention is not limited to these. The gas permeability is a value intrinsic to material, and hence does not always satisfy the above-mentioned conditions as the sealing material. In this case, the thickness thereof is made appropriate so as to satisfy the above-mentioned conditions as the sealing material.

The cylindrical part of the container and the film can be sealed by adhesion or the like by ultrasonic deposition or epoxy resin. The sealing method is not limited to this as long as the gas permeation can be suppressed in the sealing part.

The amount of the gas hardly-permeable film required for covering only the opening of the container is small, and the cost can be reduced.

Embodiments of the present invention will be described hereinafter with reference to the accompanying drawings. The present invention is not limited by these embodiments.

(Eighth Exemplary Embodiment)

Figure 15:
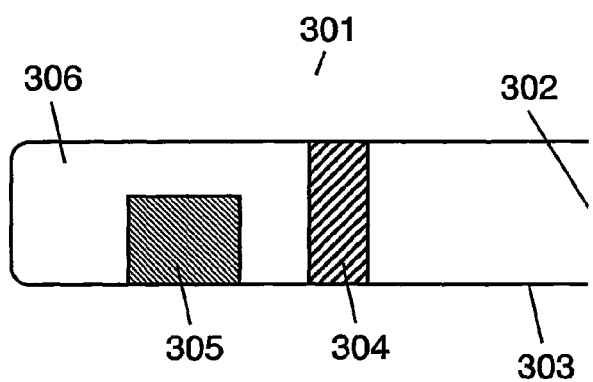
FIG. 15 is a sectional view of a gas adsorbing device at atmospheric pressure in accordance with an eighth exemplary embodiment of the present invention.
Figure 16:
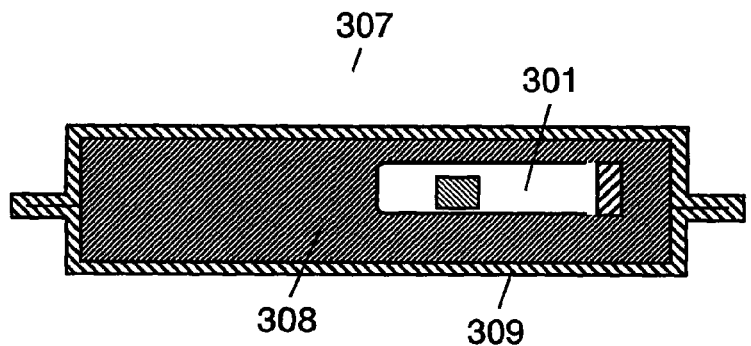
FIG. 16 is a sectional view of a vacuum heat insulator employing the gas adsorbing device in accordance with the eighth exemplary embodiment.
Figure 17:
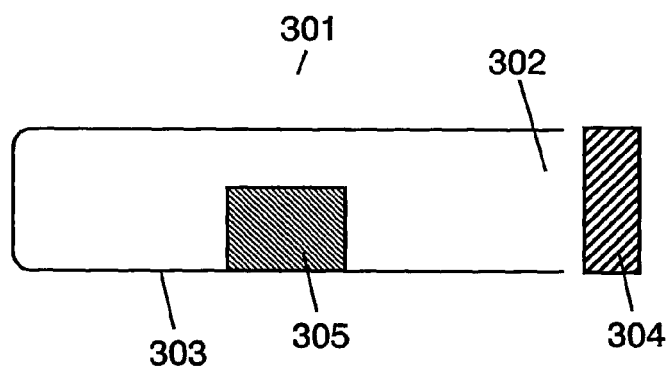
FIG. 17 is a sectional view of the gas adsorbing device under decompression in accordance with the eighth exemplary embodiment.

FIG. 15 is a sectional view of gas adsorbing device 301 at atmospheric pressure in accordance with an eighth exemplary embodiment of the present invention. FIG. 16 is a sectional view of vacuum heat insulator 307 employing gas adsorbing device 301 in accordance with the eighth exemplary embodiment. FIG. 17 is a sectional view of gas adsorbing device 301 under decompression in accordance with the eighth exemplary embodiment.

As shown in FIG. 15, gas adsorbing device 301 has the following elements:
  cylindrical container 303 that has opening 302 at its one end and is at least partially cylindrical;
  rubber-made partition 304 that is in contact with the inner wall of the cylindrical part of cylindrical container 303; and
  gas adsorbent 305 made of CuZSM-5 type zeolite and non-adsorbent gas 306 that is not adsorbed by gas adsorbent 305 that are filled in the closed space surrounded by cylindrical container 303 and partition 304.

As shown in FIG. 16, in vacuum heat insulator 307, gas adsorbing device 301 and core material 308 are covered with jacket material 309, and the inside of jacket material 309 is decompressed and sealed.

Operations and actions when gas adsorbing device 301 having such a structure is applied to vacuum heat insulator 307 are described hereinafter.

As shown in FIG. 15, non-adsorbent gas 306 is filled into the closed space formed of cylindrical container 303 and partition 304, and the volume of the closed space is determined so as to keep a balance between the pressure of non-adsorbent gas 306 and the atmospheric pressure. Since partition 304 is made of rubber, partition 304 is deformed to the same shape as that of the inner wall of the container, and the sealing property of the cylindrical container 303 and partition 304 is secured. Therefore, gas does not infiltrate into the closed space even at the atmospheric pressure, and the degradation of gas adsorbent 305 is suppressed. The relative positions between cylindrical container 303 and partition 304 are not fixed, so that partition 304 moves in the longitudinal direction of cylindrical container 303 when a force in the longitudinal direction of cylindrical container 303 is applied to partition 304.

In order to adsorb gas existing in the space outside cylindrical container 303 under decompression, gas adsorbent 305 in cylindrical container 303, is required to communicate with the space outside cylindrical container 303. This is achieved in the following process.

When gas adsorbing device 301 is placed at the atmospheric pressure, a balance is kept between the atmospheric pressure and the pressure of non-adsorbent gas 306 in the closed space surrounded by cylindrical container 303 and partition 304. When the atmosphere where gas adsorbing device 301 is placed is decompressed, the pressure of non-adsorbent gas 306 inside the closed space is larger than the pressure outside the closed space, and difference occurs between the pressure applied to the surface of partition 304 on the closed space side and the surface of partition 304 on the external space side. This pressure difference causes partition 304 to move along cylindrical container 303 to the external space side, namely to the opening 302 side, thereby increasing the volume of the closed space. When the material amount in the closed space is constant, partition 304 moves until the pressures inside and outside the closed space become the same. When decompression is further performed, partition 304 further moves toward the opening 302 of cylindrical container 303 and separates from cylindrical container 303.

As shown in FIG. 17, when partition 304 separates from cylindrical container 303, gas adsorbent 305 communicates with the external space of gas adsorbing device 301 through opening 302 and the adsorption of gas is allowed.

Vacuum heat insulator 307 is prepared by inserting gas adsorbing device 301 and core material 308 into jacket material 309 that is previously formed in a bag shape by sealing three sides, installing jacket material 309 in a vacuum chamber and decompressing it, then sealing a non-sealed part of jacket material 309 by thermal deposition.

The volume of the closed space surrounded by cylindrical container 303 and partition 304 under decompression is calculated as below.

According to Boyle-Charles law, the product of the volume and pressure of the gas in the closed space is constant, so that "volume of closed space at atmospheric pressure×
  atmospheric pressure=volume of closed space
  under decompression×pressure under decompression"

is obtained. Therefore, the volume of the closed space under decompression is as follows, "volume of closed space under
  decompression=volume of closed space at atmospheric pressure/(pressure under decompression/
  atmospheric pressure)".

Under a static condition, the pressure when partition 304 reaches opening 302 equals to the pressure at which gas adsorbent 305 communicates with the external atmosphere. Therefore, the following relationship is satisfied, "volume of cylindrical container 303/volume of
  closed space at atmospheric
  pressure=atmospheric pressure/pressure at which
  gas adsorbent 305 communicates with external
  atmosphere".

Therefore,

"pressure at which gas adsorbent 305 communicates
  with external atmosphere=atmospheric pressure×
  volume of closed space at atmospheric pressure/
  volume of cylindrical container 303"is obtained.

As a result, the following is found. The pressure at which gas adsorbent 305 communicates with the external atmosphere is proportional to the ratio of the volume of the closed space at the atmospheric pressure to the volume of cylindrical container 303. These values can be controlled in designing gas adsorbing device 301. Making the values appropriate allows control of the pressure at which gas adsorbent 305 communicates with the external atmosphere.

(Ninth Exemplary Embodiment)

Figure 18:
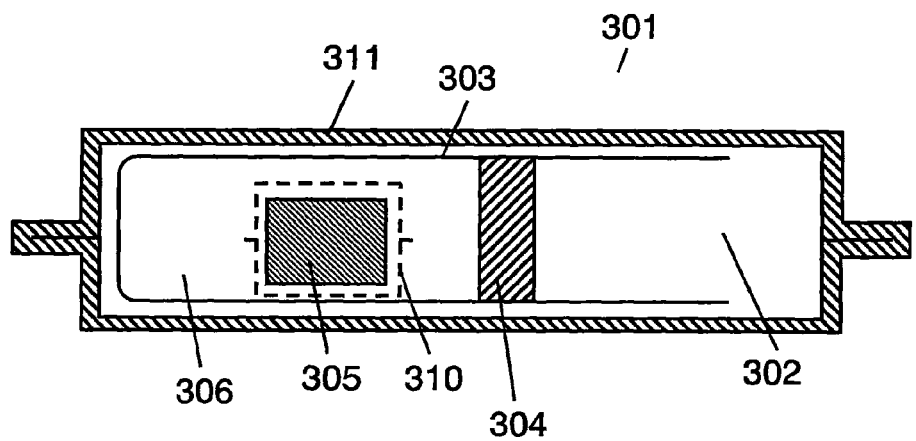
FIG. 18 is a sectional view of a gas adsorbing device in accordance with a ninth exemplary embodiment of the present invention.

FIG. 18 is a sectional view of gas adsorbing device 301 in accordance with a ninth exemplary embodiment of the present invention.

As shown in FIG. 18, in gas adsorbing device 301, gas adsorbent 305 is covered with packaging material 310, and cylindrical container 303 is covered with covering material 311. In FIG. 18, packaging material 310 is made of non-woven fabric. Covering material 311 is prepared by thermally depositing a plastic laminated film. A part of low-density polyethylene of a laminated film is faced to the other part thereof, and four sides are thermally deposited, thereby separating the space inside covering material 311 from the space outside it. Here, the laminated film is formed by stacking the low-density polyethylene, aluminum foil, and nylon in that order Since covering material 311 includes aluminum foil, the gas permeability is extremely small, and the amount of the gas infiltrating into covering material 311 is extremely small. Even when gas adsorbing device 301 is left in the atmosphere for a long time, gas adsorbent 305 hardly degrades and the essential adsorbing characteristic can be obtained.

When the periphery of cylindrical container 303 is decompressed, the gas around gas adsorbent 305 is discharged to the outside of cylindrical container 303 through packaging material 310. When the discharge speed is high, gas adsorbent 305 can scatter disadvantageously. However, gas adsorbent 305 remains inside packaging material 310 and hence does not scatter.

When gas adsorbing device 301 is applied to vacuum heat insulator 307, gas adsorbent 305 does not scatter inside packaging material 310 and vacuum heat insulator 307 can be easily recycled.

For reproducing the function of gas adsorbing device 301 of the present embodiment, covering material 311 is broken and removed before using it. The operation of gas adsorbing device 301 under decompression is similar to that of the eighth exemplary embodiment.

(Tenth Exemplary Embodiment)

Figure 19:
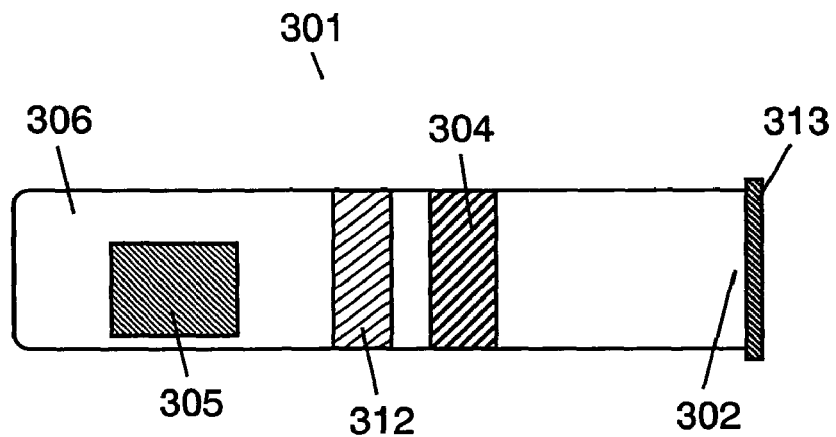
FIG. 19 is a sectional view of a gas adsorbing device in accordance with a tenth exemplary embodiment of the present invention.

FIG. 19 is a sectional view of gas adsorbing device 301 in accordance with a tenth exemplary embodiment of the present invention.

As shown in FIG. 19, in gas adsorbing device 301, divider 312 is installed between gas adsorbent 305 and partition 304. Gas permeation through opening 302 is suppressed by seal 313. Divider 312 is made of glass wool. Seal 313 is a plastic laminated film, and formed by stacking nylon, aluminum foil, and nylon in that order. Seal 313 is stuck to cylindrical container 303 with epoxy resin and separates the space inside cylindrical container 303 from the space outside it.

Since seal 313 includes aluminum foil, the gas permeability is extremely small, and the amount of the gas infiltrating into cylindrical container 303 is extremely small. Even when gas adsorbing device 301 is left in the atmosphere for a long time, gas adsorbent 305 hardly degrades and the essential adsorbing characteristic can be obtained.

When the periphery of cylindrical container 303 is decompressed, the gas around gas adsorbent 305 is discharged to the outside of cylindrical container 303 through divider 312. When the discharge speed is high, gas adsorbent 305 can scatter disadvantageously. However, gas adsorbent 305 remains inside divider 312 and hence does not scatter.

When gas adsorbing device 301 is applied to vacuum heat insulator 307, gas adsorbent 305 does not scatter inside cylindrical container 303, and vacuum heat insulator 307 can be easily recycled.

For reproducing the function of gas adsorbing device 301 of the present embodiment, seal 313 is removed before using it. The operation of gas adsorbing device 301 under decompression is similar to that of the eighth exemplary embodiment.

Specific contents of gas adsorbing devices 301 of these exemplary embodiments are described in examples 7 through 9.

EXAMPLE 7

The volume of the cylindrical container is 10 ml. The volume of the closed space at the atmospheric pressure is 1 ml. Prepared gas adsorbing device 301 is installed in the vacuum chamber, and the operation thereof is verified. The inside of the vacuum chamber is decompressed from the atmospheric pressure to 100 Pa for three minutes.

The pressure at which gas adsorbent 305 communicates with the external atmosphere is 101.3 hPa when static decompression is performed. Since the decompression is performed at a finite speed, the pressure at which gas adsorbent 305 communicates with the external atmosphere is 300 Pa, lower than 101.3 hPa.

When the decompression is performed at a finite speed, the pressure deviates from the theoretical value under a static condition. However, this deviation is generated by the following mechanism. Partition 304 is fast stuck to cylindrical container 303, so that it takes time before partition 304 starts to move even when a force is applied in the longitudinal direction of cylindrical container 303. Therefore, after a lapse of time since the pressure reaches 300 hPa, partition 304 reaches opening 302 of cylindrical container 303. The decompressing step continues even during this, so that the pressure further decreases from 300 hPa. Here, the static condition means a condition where the relationship between the volume of the closed end and the external atmosphere pressure is matched with a theoretical value by extremely slowly varying the pressure.

When the decompression is performed at a finite speed, the pressure at which gas adsorbent 305 communicates with the external space becomes lower than the theoretical value under the static condition. Therefore, the degradation of gas adsorbent 305 can be further reduced.

EXAMPLE 8

The volume of cylindrical container 303 is 10 ml. The volume of the closed space at the atmospheric pressure is 1 ml. Prepared gas adsorbing device 301 is installed in the vacuum chamber, and the operation thereof is verified. The inside of the vacuum chamber is decompressed from the atmospheric pressure to 100 Pa for 60 minutes. In this case, the pressure at which gas adsorbent 305 communicates with the external atmosphere is 100.1 hPa, substantially the same as the theoretical value. That is because the decompressing speed is extremely low, and a condition pursuant to the static decompressing step is satisfied.

EXAMPLE 9

In the present example, cylindrical container 303 is covered with laminated covering material 311 formed by stacking nylon, aluminum foil, and nylon in that order. When the adsorbing characteristic of gas adsorbent 305 is evaluated after a lapse of one month since gas adsorbing device 301 is prepared, the degradation of the adsorbing capability is not recognized. That is because cylindrical container 303 is covered with covering material 311 to prevent gas from infiltrating into cylindrical container 303.

The gas adsorbing device of the present invention has a container, and a gas adsorbent is filled into the container. The container has a shell for covering the gas adsorbent, and a communication part. The communication part prevents the inside of the shell from communicating with the outside thereof when no external force is applied, or allows the inside of the shell to communicate with the outside thereof when an external force is applied. When an external force is applied, gas flow between the internal space and external space is allowed, and the gas adsorbent exhibits the gas adsorbing capability. When no external force is applied, the gas adsorbent does not come into contact with the external gas such as air, and hence the degradation of the gas adsorbent can be suppressed.

Therefore, reduction or fluctuation in gas adsorbing performance due to exposure in the air atmosphere is suppressed, and the gas adsorbing performance can be stably exhibited.

The gas adsorbent is preferably vacuum-filled into the container shell. The gas adsorbent may be decompressed and filled together with a minute amount of non-adsorbent gas such as argon or xenon.

The gas adsorbent can be selected in response to adsorbed gas, but a gas adsorbent capable of adsorbing an air component is selected when it is applied to a vacuum heat insulator. An example of the gas adsorbent is an air component adsorbent made of Ba—Li alloy (combo getter manufactured by SAES Co., Ltd.) or copper-ion-exchanged CuZSM-5 type zeolite.

A predetermined external force of the present invention is atmospheric pressure, pressure such as water pressure, magnetic force, physical force by a person or device, for example, and is not especially limited to these. When the gas adsorbent is applied to the vacuum heat insulator, it is easy that a heat insulation material is vacuum-packaged and then the atmospheric pressure applied to the vacuum heat insulator is utilized.

For preventing degradation of the gas adsorbent, it is preferable to select gas hardly-permeable material as the material of the container. The container is a metal container of aluminum, copper, or stainless steel, a laminated film container with low gas permeability, a resin container stuck with aluminum foil, or a glass container, for example.

In the gas adsorbing device of the present invention, the container including a gas adsorbent is formed of two or more members. A communication part is formed by disposing an arbitrary defective part in at least one of the members, and gas flow between the inner space and outer space of the container is allowed through the defective part by an external force. Since the gas flow between the inner space and outer space of the container is allowed only by applying the external force, the gas adsorbent does not come into contact with the air in the atmosphere until a predetermined external force is applied, and the gas adsorbent does not degrade. Therefore, fluctuation in gas adsorbing performance due to exposure in the air atmosphere is suppressed, and the gas adsorbing performance can be stably exhibited.

In the gas adsorbing device of the present invention, the container including a gas adsorbent is formed of two or more members. One and the other of the members have an arbitrary defective part, and gas flow between the inner space and outer space is allowed by matching the defective parts with each other with an external force. Since the gas flow between the inner space and outer space is allowed only by applying the external force, the gas adsorbent does not come into contact with the air in the atmosphere until a predetermined external force is applied, and the gas adsorbent does not degrade. Therefore, fluctuation in gas adsorbing performance due to exposure in the air atmosphere is suppressed, and the gas adsorbing performance can be stably exhibited.

In the gas adsorbing device of the present invention, the members have gas shielding property, gas permeation in a joint between at least two members is shielded with a grease-like material, and the joint is movable. Since the members have gas shielding property and the gas permeation in the joint is shielded with the grease-like material, the infiltration of air is further suppressed and the reliability can be improved. Mobility by the external force is further smoothed by applying the grease-like material.

In the gas adsorbing device of the present invention, the defective part is a through hole. Applying the external force allows the gas flow between the inner space and outer space through the through hole, and the gas adsorbing performance can be rapidly exhibited.

In the gas adsorbing device of the present invention, the defective part is a slit. Applying the external force allows the gas flow between the inner space and outer space through the slit, and the gas adsorbing performance can be rapidly exhibited.

In the gas adsorbing device of the present invention, the predetermined external force is atmospheric pressure. In the case that the gas adsorbing device having a container including the gas adsorbent is applied to a vacuum heat insulator, when the vacuum heat insulator is vacuum-packaged and then taken to the atmosphere, the atmospheric pressure applied to the vacuum heat insulator acts as the external force, gas can flow between the inner space and outer space, and the gas adsorbing performance can be rapidly exhibited. Therefore, the gas adsorbent does not come into contact with the atmosphere, but can communicate with only the inner space of the vacuum-sealed vacuum heat insulator. The gas adsorbent is not degraded by contact with the atmosphere, stably adsorbs main air components such as a minute amount of nitrogen and oxygen infiltrating into the vacuum heat insulator with time, can keep the degree of vacuum for a long time, and can provide high heat insulation performance.

In the gas adsorbing device of the present invention, the gas adsorbent can adsorb at least one of components contained in air. When this gas adsorbing device is applied to a vacuum heat insulator, the gas adsorbent can adsorb the residual air in the vacuum heat insulator to increase the degree of vacuum. The gas adsorbent can also adsorb the air components infiltrating from the outside through the jacket material.

In the gas adsorbing device of the present invention, the gas adsorbing device and a core material are covered with the jacket material, the inside of the jacket material is decompressed, and air flows between the gas adsorbing device and the core material.

The vacuum heat insulator of the present invention includes the following steps:
  disposing the gas adsorbing device having the container including the gas adsorbent inside the jacket material together with the core material;
  decompressing and sealing the jacket material; and
  taking it to the atmospheric pressure state.

The decompressed and sealed vacuum heat insulator receives vertical force from the atmospheric pressure. The vertical force acts as the external force, gas can flow between the inner space and outer space of the container through the defective part, and the gas adsorbent immediately adsorbs the residual gas in the vacuum heat insulator.

The gas adsorbent is isolated from the outer space until the external force acts, so that the gas adsorbent does not come into contact with the air in the atmosphere in the producing step, and the gas adsorbing performance does not degrade. The gas adsorbent can be used without problems regardless of the amount of the producing time of the vacuum heat insulator. Therefore, the vacuum heat insulator can be obtained that has no fluctuation in adsorbing performance due to exposure in the air atmosphere, can be stably produced, and has satisfactory long-term reliability.

Assuming that the atmospheric pressure applied to the vacuum heat insulator when the vacuum heat insulator is installed in the atmosphere is the external force, the external force can be used as a switching function for easily exhibiting the gas adsorbing capability.

The gas adsorbent of the present invention is preferably decompressed and filled into the container, and may be filled together with a minute amount of non-adsorbent gas such as argon or xenon. Argon or xenon has low gas heat conductivity, so that a minute amount of argon or xenon does not have a great influence on the heat insulation performance.

As the core material of the present invention, a communication foam of polymer material such as polystyrene or polyurethane, a communication foam of inorganic material, inorganic or organic powder, or inorganic or organic fiber material can be used. Alternatively, a mixture of them may be used.

As the core material of the present invention, a material having gas barrier property, namely various materials and composite material capable of preventing gas infiltration, can be used. These materials are, for example, a metal container, a glass container, a gas barrier container where resin and metal are stacked, a laminated film including a surface protecting layer, gas barrier layer, and thermal deposition layer.

Embodiments of the present invention will be described hereinafter with reference to the accompanying drawings. The present invention is not limited by these embodiments.

(Eleventh Exemplary Embodiment)

Figure 20:
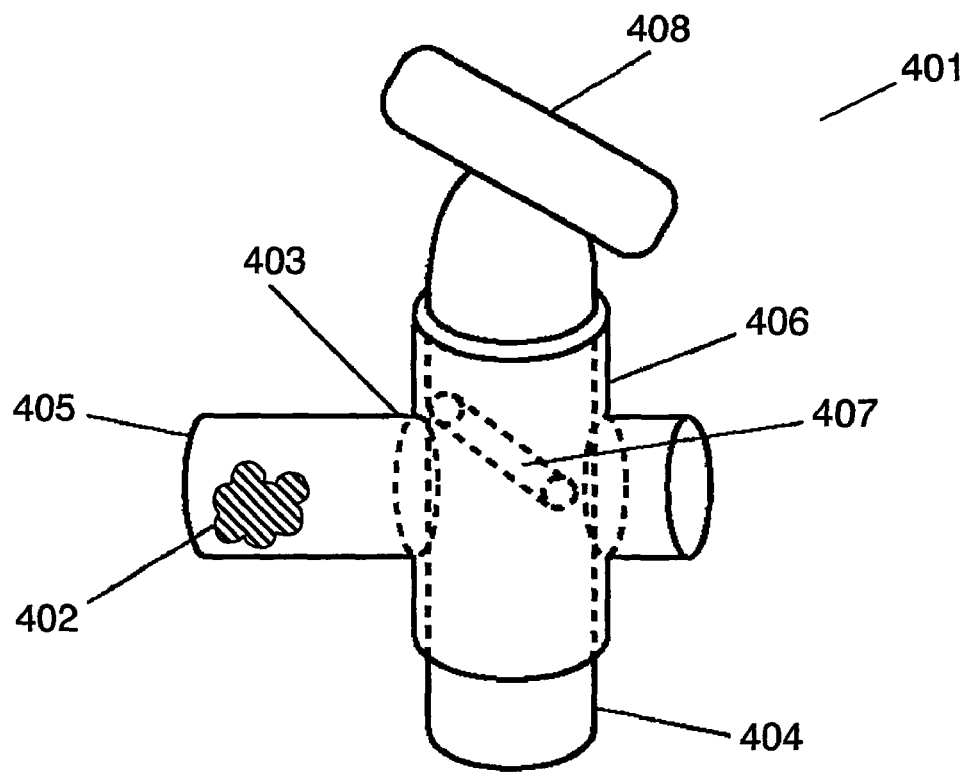
FIG. 20 is a perspective view showing a sealed state of a container constituting a gas adsorbing device in accordance with an eleventh exemplary embodiment of the present invention.
Figure 21:
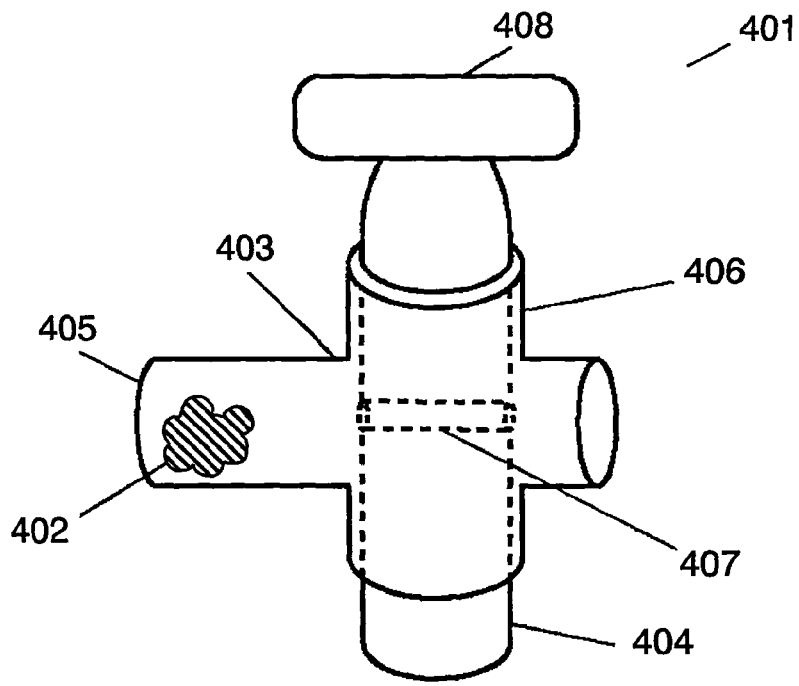
FIG. 21 is a perspective view showing a communication state between the inside and outside of the container constituting the gas adsorbing device in accordance with the eleventh exemplary embodiment.

FIG. 20 is a perspective view showing a sealed state of container 401 including gas adsorbent 402 constituting a gas adsorbing device in accordance with an eleventh exemplary embodiment of the present invention. FIG. 21 is a perspective view showing a communication state between the inside and outside of container 401 including gas adsorbent 402 in accordance with the eleventh exemplary embodiment.

As shown in FIG. 20 and FIG. 21, container 401 including gas adsorbent 402 has the following elements:
gas adsorbent 402;
member 403 having a shape of a cross branch pipe having three opening sides, namely a cylindrical pipe whose both ends are opening perpendicularly crosses a closed-end cylindrical container whose one end is opening and the other end is blocked; and
substantially columnar member 404 where a part of a side surface is in contact with the inner surface of the cylindrical pipe whose both ends are opening in member 403.
Member 403 has the following elements:
container part 405 that is a bottom part of the closed-end cylindrical container and includes gas adsorbent 402; and
pipe part 406 that has a cylindrical pipe shape whose both ends are opening and inner surface is in contact with member 404.
Member 404 has a columnar shape having cock 408 and defective part 407 as a through hole. Cock 408 is turned by external force, thereby switching between the following two states. In the first state, both ends of the through hole of defective part 407 are blocked with the inner surface of pipe part 406 of member 403, the opening part of the closed-end cylindrical container of member 403 is cut off from container part 405 including gas adsorbent 402 with member 404, and container part 405 including gas adsorbent 402 is sealed. In the second state, the opening part of the closed-end cylindrical container in member 403 communicates with container part 405 including gas adsorbent 402 through the through hole of defective part 407. A part where the inner surface of pipe part 406 of member 403 is in contact with the outer surface of member 404 is coated with vacuum grease.

In FIG. 20, no external force is applied, so that both ends of the through hole of defective part 407 are blocked with the inner surface of member 403, and the opening part of the closed-end cylindrical container of member 403 is cut off from container part 405 including gas adsorbent 402 with member 404. Therefore, the inside of container 401 (container 405) does not communicate with the outside thereof, and the inner space of container 401 (container 405) is kept in a vacuum state.

As shown in FIG. 21, an external force is applied to cock 408, the through hole of defective part 407 of member 404 becomes parallel with the pipe direction of the closed-end cylindrical container of member 403, gas flow between the inner space and outer space of container 401 (container 405) is allowed through defective part 407. Gas adsorbent 402 included in container 405 can thus adsorb the gas in the outer space.

Container 401 including gas adsorbent 402 of the eleventh exemplary embodiment has the following elements:
a shell (member 403 and member 404) for covering gas adsorbent 402; and
a communication part (defective part 407) that prevents the inside of the shell from communicating with the outside thereof when no external force is applied, or allows the inside of the shell to communicate with the outside thereof when the external force is applied.

Therefore, when the external force is applied, gas flow between the inner space and outer space is allowed and gas adsorbent 402 exhibits the gas adsorbing capability. When no external force is applied, the gas adsorbent does not come into contact with the external gas such as air and hence the degradation of gas adsorbent 402 is suppressed.

Therefore, reduction or fluctuation in gas adsorbing performance due to exposure in the air atmosphere is suppressed, and the gas adsorbing performance can be stably exhibited.

Gas adsorbent 402 is preferably vacuum-filled into container 401, but may be decompressed and filled together with a minute amount of non-adsorbent gas such argon or xenon.

Gas adsorbent 402 can be selected in response to adsorbed gas, and an adsorbent capable of adsorbing an air component is selected when it is applied to a vacuum heat insulator. An example of the gas adsorbent is an air component adsorbent made of Ba—Li alloy (combo getter manufactured by SAES Co., Ltd.) or copper-ion-exchanged CuZSM-5 type zeolite.

The predetermined external force is atmospheric pressure, pressure such as water pressure, magnetic force, physical force by a person or device, for example, and is not especially limited to these. When the gas adsorbent is applied to the vacuum heat insulator, it is easy that a heat insulation material is vacuum-packaged and then the atmospheric pressure applied to the vacuum heat insulator is utilized.

For preventing degradation of gas adsorbent 402, it is preferable to select gas hardly-permeable material as the material of container 401. The container is a metal container of aluminum, copper, or stainless steel, a laminated film container with low gas permeability, a resin container stuck with aluminum foil, or a glass container, for example.

In container 401 including gas adsorbent 402, member 403 and member 404 have gas shielding property, gas permeation in the joint between member 403 and member 404 is shielded by vacuum grease, and the joint is movable. Since the gas permeation in the joint between member 403 and member 404 having gas shielding property is shielded by the grease-like material, the infiltration of air is further suppressed and the reliability can be improved. Mobility by the external force is further smoothed by applying the grease-like material.

In container 401 including gas adsorbent 402 of the eleventh exemplary embodiment, defective part 407 is a through hole. Applying the external force allows the gas flow between the inner space and outer space through the through hole, and the gas adsorbing performance can be rapidly exhibited.

(Twelfth Exemplary Embodiment)

Figure 22:
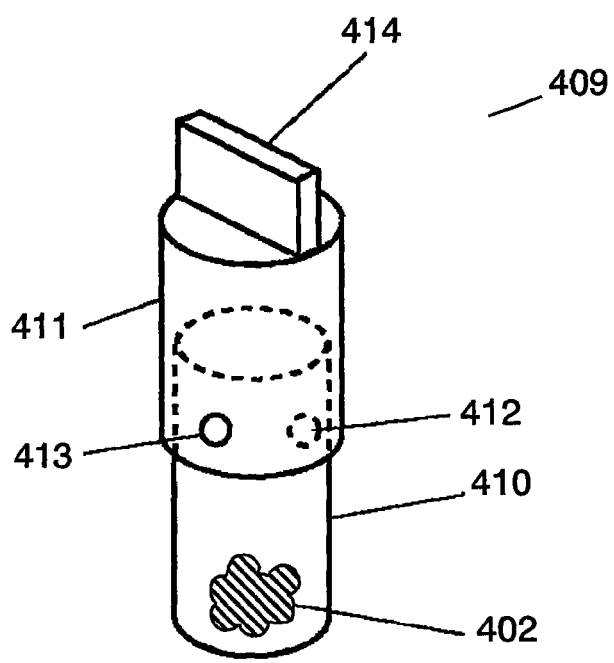
FIG. 22 is a perspective view showing a sealed state of a container constituting a gas adsorbing device in accordance with a twelfth exemplary embodiment of the present invention.
Figure 23:
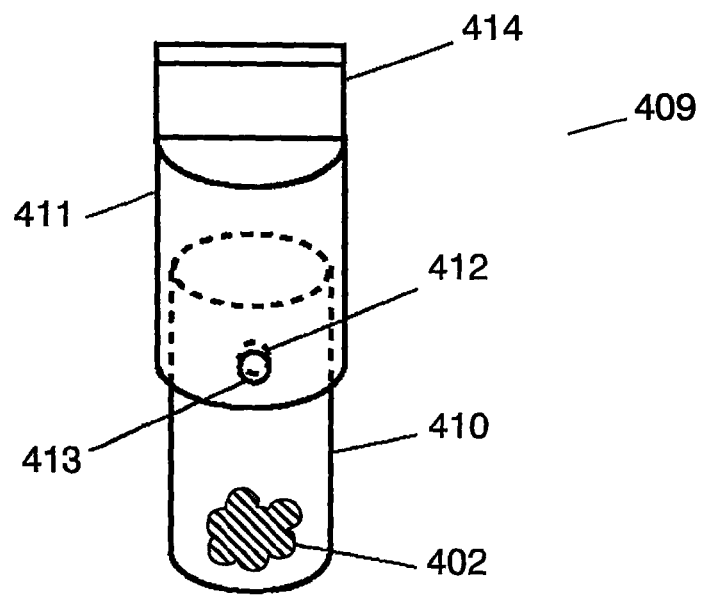
FIG. 23 is a perspective view showing a communication state between the inside and outside of the container constituting the gas adsorbing device in accordance with the twelfth exemplary embodiment.

FIG. 22 is a perspective view showing a sealed state of container 409 constituting a gas adsorbing device and including gas adsorbent 402 in accordance with a twelfth exemplary embodiment of the present invention. FIG. 23 is a perspective view showing a communication state between the inside and outside of container 409 including gas adsorbent 402 in accordance with the twelfth exemplary embodiment.

As shown in FIG. 22 and FIG. 23, container 409 including gas adsorbent 402 has the following elements:
gas adsorbent 402;
member 410 having a shape of a closed-end cylindrical container whose one end is opening and the other end is blocked; and
member 411 that has a shape of a closed-end cylindrical container whose one end is opening and the other end is blocked, has an inner surface in contact with the outer surface of member 410, and covers the opening of member 410.

Member 410 includes gas adsorbent 402 in a bottom side part of the closed-end cylindrical container, and has defective part 412 formed of a through hole in a part whose outer surface is covered with member 411. Member 411 is a lid part having cock 414. Member 411 has defective part 413 formed of a through hole at a position where defective part 413 overlaps defective part 412 of member 410 when member 411 turns at a predetermined position in the part covering the outer surface of member 410. The contact part between member 410 and member 411 is coated with vacuum grease.

In FIG. 22, no external force is applied, so that defective part 412 of member 410 is blocked by the inner surface of member 411, the inside of container 409 does not communicate with the outside thereof, and the inner space of container 409 is kept in a vacuum state.

As shown in FIG. 23, after an external force is applied to cock 414, defective part 412 of member 410 matches with defective part 413 of member 411, gas flow between the inner space and outer space of container 409 is allowed through defective part 412 and defective part 413, and gas adsorbent 402 can adsorb the gas in the outer space.

Container 409 including gas adsorbent 402 of the twelfth exemplary embodiment has the following elements:
a shell (member 410 and member 411) for covering gas adsorbent 402; and
a communication part (defective part 412 and defective part 413) that prevents the inside of the shell from communicating with the outside thereof when no external force is applied, or allows the inside of the shell to communicate with the outside thereof when the predetermined external force is applied.

When the external force is applied, gas flow between the inner space and outer space is allowed and gas adsorbent 402 exhibits the gas adsorbing capability. When no external force is applied, gas adsorbent 402 does not come into contact with the external gas such as air and hence the degradation of gas adsorbent 402 is suppressed.

Therefore, reduction or fluctuation in gas adsorbing performance due to exposure in the air atmosphere is suppressed, and the gas adsorbing performance can be stably exhibited.

Gas adsorbent 402 is preferably vacuum-filled into container 409, but may be decompressed and filled together with a minute amount of non-adsorbent gas such argon or xenon.

Gas adsorbent 402 can be selected in response to adsorbed gas, and an adsorbent capable of adsorbing an air component is selected when it is applied to a vacuum heat insulator. An example of the gas adsorbent is an air component adsorbent made of Ba—Li alloy (combo getter manufactured by SAES Co., Ltd.) or copper-ion-exchanged CuZSM-5 type zeolite.

The predetermined external force is atmospheric pressure, pressure such as water pressure, magnetic force, physical force by a person or device, for example, and is not especially limited to these. When the gas adsorbent is applied to the vacuum heat insulator, it is easy that a heat insulation material is vacuum-packaged and then the atmospheric pressure applied to the vacuum heat insulator is utilized.

For preventing degradation of gas adsorbent 402, it is preferable to select gas hardly-permeable material as the material of container 409. The container is a metal container of aluminum, copper, or stainless steel, a laminated film container with low gas permeability, a resin container stuck with aluminum foil, or a glass container, for example.

In container 409 including gas adsorbent 402 of the twelfth exemplary embodiment, member 410 and member 411 have gas shielding property, gas permeation in the joint between member 410 and member 411 is shielded by vacuum grease, and the joint is movable. Since the gas permeation in the joint between member 410 and member 411 having gas shielding property is shielded by the grease-like material, the infiltration of air is further suppressed and the reliability can be improved. Mobility by the external force is further smoothed by applying the grease-like material.

In container 409 including gas adsorbent 402 of the twelfth exemplary embodiment, defective part 412 and defective part 413 are through holes. Applying the external force allows the gas flow between the inner space and outer space through the through holes, and the gas adsorbing performance can be rapidly exhibited.

(Thirteenth Exemplary Embodiment)

Figure 24:
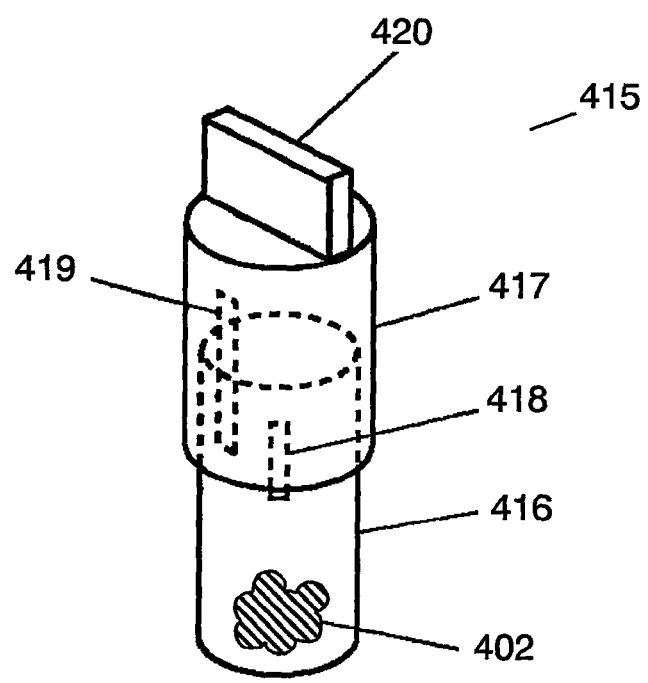
FIG. 24 is a perspective view showing a sealed state of a container constituting a gas adsorbing device in accordance with a thirteenth exemplary embodiment of the present invention.

FIG. 24 is a perspective view showing a sealed state of container 415 constituting a gas adsorbing device and including gas adsorbent 402 in accordance with a thirteenth exemplary embodiment of the present invention.

Figure 25:
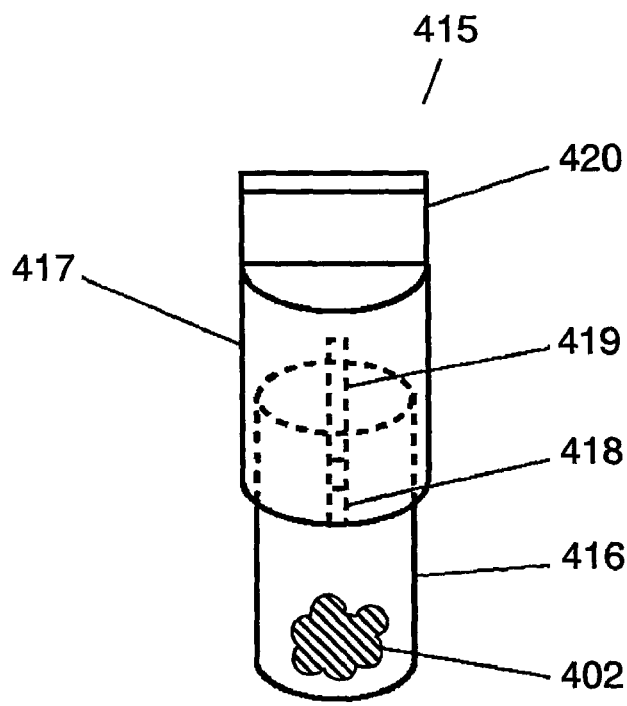
FIG. 25 is a perspective view showing a communication state between the inside and outside of the container constituting the gas adsorbing device in accordance with the thirteenth exemplary embodiment.

FIG. 25 is a perspective view showing a communication state between the inside and outside of container 415 including gas adsorbent 402 in accordance with the thirteenth exemplary embodiment.

As shown in FIG. 24 and FIG. 25, container 415 including gas adsorbent 402 has the following elements:
gas adsorbent 402;
member 416 having a shape of a closed-end cylindrical container whose one end is opening and the other end is blocked; and
member 417 that has a shape of a closed-end cylindrical container whose one end is opening and the other end is blocked, has an inner surface in contact with the outer surface of member 416, and covers the opening of member 416.

Member 416 includes gas adsorbent 402 in a bottom side part of the closed-end cylindrical container, and has, in its outer surface, defective part 418 of a slit shape (groove shape does not penetrate the inner and outer surfaces of member 416). This slit shape extends in the pipe direction of the closed-end cylindrical container, from the part covered with member 417 to the part that is not covered with member 417, and without reaching the opening of member 416. Member 417 is a lid part having cock 420, and has, in its inner surface, defective part 419 of a slit shape (groove shape does not penetrate the inner and outer surfaces of member 417). This slit shape extends in the pipe direction of the closed-end cylindrical container, from the part covering the outer surface of member 416 to the part that does not cover the outer surface of member 416, and without reaching the opening of member 417. The contact part between member 416 and member 417 is coated with vacuum grease.

When member 417 turns to a predetermined position, the opening side part of member 416 in defective part 418 faces the opening side part of member 417 in defective part 419, and the inside of container 415 communicates with the outside thereof. When member 417 turns to a position other than the predetermined position, the opening side part of member 416 in defective part 418 does not face the opening side part of member 417 in defective part 419, and the inside of container 415 does not communicate with the outside thereof.

In FIG. 24, no external force is applied, so that the position of defective part 418 in member 416 displaces from the position of defective part 419 in member 417 in the turning direction of member 417, the inside of container 415 communicates with the outside thereof, and the inner space of container 415 is kept in a vacuum state.

As shown in FIG. 25, after an external force is applied to cock 420, the opening side part of member 416 in defective part 418 overlaps the opening side part of member 417 in defective part 419. Gas can flow between the inner space and outer space of container 415 through a clearance formed between defective part 419 in member 417 and the outer surface of member 416 and a clearance formed between defective part 418 in member 416 and the inner surface of member 417. Thus, gas adsorbent 402 can adsorb the gas in the outer space of container 415.

Container 415 including gas adsorbent 402 of the thirteenth exemplary embodiment has the following elements:
 a shell (member 416 and member 417) for covering gas adsorbent 402; and
 a communication part (defective part 418 and defective part 419) that prevents the inside of the shell from communicating with the outside thereof when no external force is applied, or allows the inside of the shell to communicate with the outside thereof when the predetermined external force is applied.

When the external force is applied, gas flow between the inner space and outer space is allowed and gas adsorbent 402 exhibits the gas adsorbing capability. When no external force is applied, gas adsorbent 402 does not come into contact with the external gas such as air and hence the degradation of gas adsorbent 402 is suppressed.

Therefore, reduction or fluctuation in gas adsorbing performance due to exposure in the air atmosphere is suppressed, and the gas adsorbing performance can be stably exhibited.

Gas adsorbent 402 is preferably vacuum-filled into container 415, but may be decompressed and filled together with a minute amount of non-adsorbent gas such as argon or xenon.

Gas adsorbent 402 can be selected in response to adsorbed gas, and an adsorbent capable of adsorbing an air component is selected when it is applied to a vacuum heat insulator. An example of the gas adsorbent is an air component adsorbent made of Ba—Li alloy (combo getter manufactured by SAES Co., Ltd.) or copper-ion-exchanged CuZSM-5 type zeolite.

The predetermined external force is atmospheric pressure, pressure such as water pressure, magnetic force, physical force by a person or device, for example, and is not especially limited to these. When the gas adsorbent is applied to the vacuum heat insulator, it is easy that a heat insulation material is vacuum-packaged and then the atmospheric pressure applied to the vacuum heat insulator is utilized.

For preventing degradation of gas adsorbent 402, it is preferable to select gas hardly-permeable material as the material of container 415. The container is a metal container of aluminum, copper, or stainless steel, a laminated film container with low gas permeability, a resin container stuck with aluminum foil, or a glass container, for example.

In container 415 including the gas adsorbent of the thirteenth exemplary embodiment, member 416 and member 417 have gas shielding property, gas permeation in the joint between member 416 and member 417 is shielded by vacuum grease, and the joint is movable. Since the gas permeation in the joint between member 416 and member 417 having gas shielding property is shielded by the grease-like material, the infiltration of air is further suppressed and the reliability can be improved. Mobility by the external force is further smoothed by applying the grease-like material.

In container 415 including gas adsorbent 402 of the thirteenth exemplary embodiment, defective part 418 and defective part 419 are slits. Applying the external force allows the gas flow between the inner space and outer space through the slits and the gas adsorbing performance can be rapidly exhibited.

(Fourteenth Exemplary Embodiment)

Figure 26:
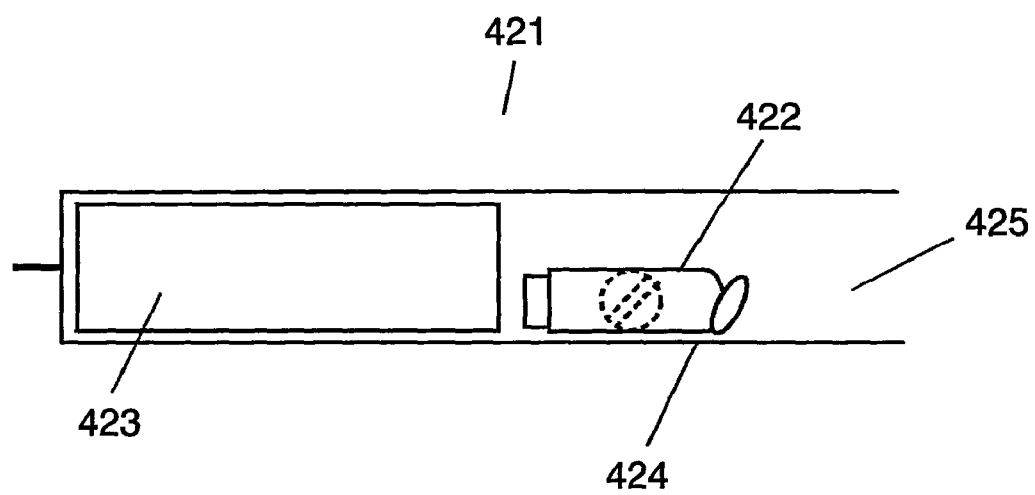
FIG. 26 is a schematic sectional view of a vacuum heat insulator before vacuum packaging in accordance with a fourteenth exemplary embodiment of the present invention.
Figure 27:
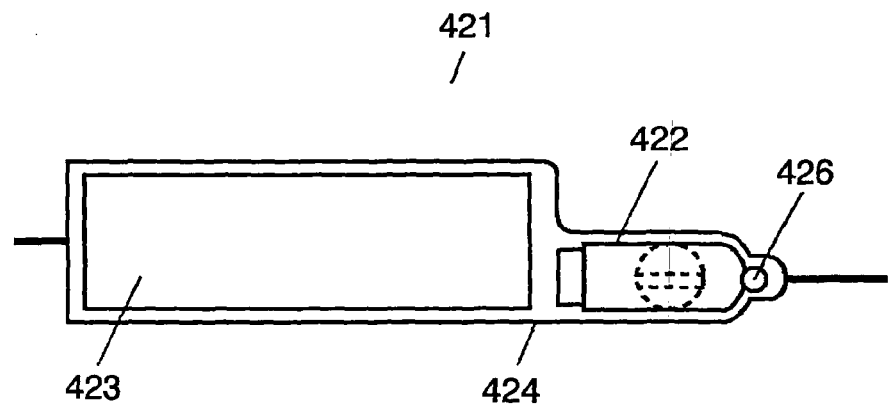
FIG. 27 is a schematic sectional view of a vacuum heat insulator in the atmosphere after vacuum packaging in accordance with the fourteenth exemplary embodiment of the present invention.

FIG. 26 is a schematic sectional view of vacuum heat insulator 421 before vacuum packaging in accordance with a fourteenth exemplary embodiment of the present invention. FIG. 27 is a schematic sectional view of vacuum heat insulator 421 in the atmosphere after vacuum packaging in accordance with the fourteenth exemplary embodiment of the present invention.

Vacuum heat insulator 421 of the fourteenth exemplary embodiment is formed by covering gas adsorbing device 422 having a container including gas adsorbent 402 and core material 423 with jacket material 424 made of a gas hardly-permeable laminated film, and by decompressing the inside of jacket material 424. Here, the container means the container including gas adsorbent 402 in one of the eleventh embodiment through thirteenth embodiment, and gas adsorbing device 422 means the gas adsorbing device in one of the eleventh embodiment through thirteenth embodiment.

The container including gas adsorbent 402 constituting gas adsorbing device 422 includes an air component adsorbent (gas adsorbent 402) made of copper-ion-exchanged CuZSM-5 type zeolite, and the inner space of the container is kept in a decompressed state by a minute amount of argon gas. No external force is applied, so that the inside of the container does not communicate with the outside thereof.

Vacuum heat insulator 421 in the state of FIG. 26 is handled as follows. Predetermined evacuation is performed by a vacuum pump in a decompressing chamber using a vacuum packaging machine, then opening 425 is thermally deposited, and vacuum heat insulator 421 is taken to the atmosphere.

As shown in FIG. 27, regarding vacuum heat insulator 421 in the atmosphere after vacuum packaging, the atmospheric pressure acts as the external force to the cock 426 of the container including the gas adsorbent, the inner space of the container communicates with the outer space thereof through the defective part. Therefore, gas can flow between the inner space and the outer space and the gas adsorbent communicates with the inside of vacuum heat insulator 421 including core material 423 through vacuum space.

Thus, a minute amount of residual air remaining in core material 423 or a minute amount of air infiltrating from the outside can be adsorbed or immobilized by an air component adsorbent (gas adsorbent 402) that communicates with core material 423 through the vacuum space. The internal pressure can be kept at a predetermined degree of vacuum or lower.

For evaluating the aging characteristic, vacuum heat insulator 421 is left at rest in air at 80° C. for three months as a promoting test. According to this promoting test, variation in heat conductivity is 1% through 2%, and performance can be sufficiently kept.

In the present embodiment, when vacuum heat insulator 421 is vacuum-packaged and then taken to the atmosphere, the atmospheric pressure applied to vacuum heat insulator 421 acts as the external force, the gas flow between the inner space and outer space of the container is allowed, and the gas adsorbing performance can be rapidly exhibited. Therefore, gas adsorbent 402 does not come into contact with the atmosphere, but can communicate with only the inner space of vacuum-sealed vacuum heat insulator 421. The gas adsorbent is not degraded by contact with the atmosphere, stably adsorbs main air components such as a minute amount of nitrogen and oxygen infiltrating into vacuum heat insulator 421 with time, can keep the degree of vacuum for a long time, and can provide high heat insulation performance.

In the present embodiment, gas adsorbent 402 can adsorb at least one of components contained in air. When gas adsorbent 402 is applied to vacuum heat insulator 421, gas adsorbent 402 can adsorb the residual air in vacuum heat insulator 421 to increase the degree of vacuum. The gas adsorbent can adsorb the air components infiltrating from the outside through jacket material 424.

In vacuum heat insulator 421 of the present invention, gas adsorbing device 422 and core material 423 are covered with jacket material 424, the inside of jacket material 424 is decompressed, and gas flows between gas adsorbent 402 and core material 423. Here, gas adsorbing device 422 has a container that has the same structure as those of eleventh through thirteenth embodiments and includes gas adsorbent 402.

Vacuum heat insulator 421 includes the following steps:
disposing gas adsorbing device 422 having the container including gas adsorbent 402 inside jacket material 424 together with core material 423;
decompressing and sealing the jacket material; and
taking it to the atmospheric pressure state.

Decompressed and sealed vacuum heat insulator 421 receives a vertical force from the atmospheric pressure. The vertical force acts as the external force, gas can flow between the inner space and outer space of the container through the defective part, and gas adsorbent 402 immediately adsorbs the residual gas in vacuum heat insulator 421.

Gas adsorbent 402 is isolated from the outer space until the external force acts, so that gas adsorbent 402 does not come into contact with the air in the atmosphere in the producing step, and the gas adsorbing performance of gas adsorbent 402 does not degrade. The gas adsorbent can be used without problems regardless of the amount of the producing time of vacuum heat insulator 421. Therefore, vacuum heat insulator 421 can be obtained that has no fluctuation in adsorbing performance due to exposure in an air atmosphere, can be stably produced, and has satisfactory long-term reliability.

When the atmospheric pressure applied to vacuum heat insulator 421 when vacuum heat insulator 421 is installed in the atmosphere is assumed to be the external force, the external force can be used as a switching function for easily exhibiting the gas adsorbing capability.

Gas adsorbent 402 is preferably decompressed and filled into the container, and may be filled together with a minute amount of non-adsorbent gas such as argon or xenon. Argon or xenon has low gas heat conductivity, so that a minute amount of argon or xenon does not have a great influence on the heat insulation performance.

As core material 423, a communication foam of polymer material such as polystyrene or polyurethane, a communication foam of inorganic material, inorganic or organic powder, or inorganic or organic fiber material can be used. Alternatively, a mixture of them may be used.

As core material 424, a material having gas barrier property, namely various materials and composite material capable of preventing gas infiltration, can be used. These materials are, for example, a metal container, a glass container, a gas barrier container where resin and metal are stacked, and a laminated film including a surface protecting layer, gas barrier layer, and thermal deposition layer.

A producing process of the vacuum heat insulator of the present invention is as follows. An air component adsorbent that is gas-packaged into the adsorbent filling body together with non-adsorbent gas is arranged inside the jacket container together with a porous core material, and is decompressed. The non-adsorbent gas in the adsorbent filling body is evacuated through an opening that is formed by bursting a part of the adsorbent filling body expanded by pressure difference by the decompression. Then, the jacket container is sealed. The air component adsorbent is gas-packaged together with the non-adsorbent gas, is burst in the vacuum atmosphere, and is vacuum-packaged together with the porous core material. Therefore, contact with the air in the atmosphere does not occur in the producing step and the degradation of the air component adsorbent is prevented.

The vacuum heat insulator can be used without problems regardless of the amount of the producing time of the vacuum heat insulator. Fluctuation in adsorbing performance due to exposure in the air atmosphere is eliminated, so that a vacuum heat insulator that can be stably produced and has satisfactory long-term reliability is provided.

The vacuum heat insulator of the present invention has a gas adsorbing device including at least an air component adsorbent arranged in an adsorbent filling body having an opening, a porous core material, and a jacket container for storing them. The air component adsorbent communicates with the vacuum space inside the vacuum heat insulator through the opening. Thus, a minute amount of residual air remaining in the porous core material and a minute amount of air infiltrating from the outside can be adsorbed and immobilized by the air component adsorbent that communicates with the porous core material through the vacuum space, and the internal pressure can be kept at a predetermined degree of vacuum or lower. Thus, high heat insulation performance can be kept for a long time.

Embodiments of the present invention will be described hereinafter with reference to the accompanying drawings. The present invention is not limited by these embodiments.
(Fifteenth Exemplary Embodiment)

Figure 28:
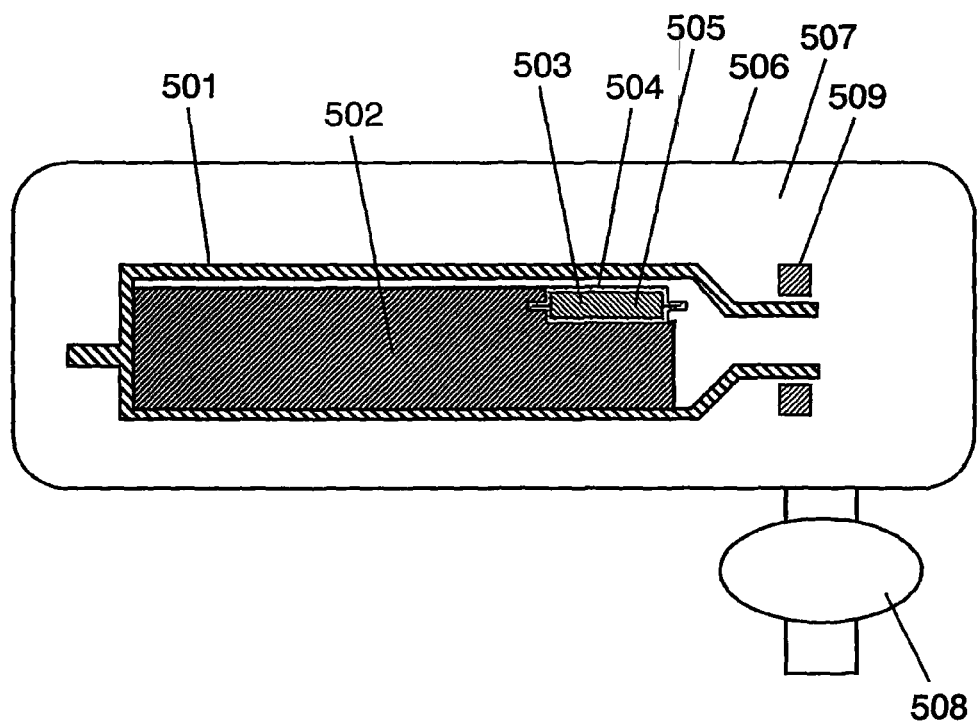
FIG. 28 is a sectional view showing the inside of a vacuum packaging machine before evacuation in a producing process of a vacuum heat insulator in accordance with a fifteenth exemplary embodiment of the present invention.
Figure 29:
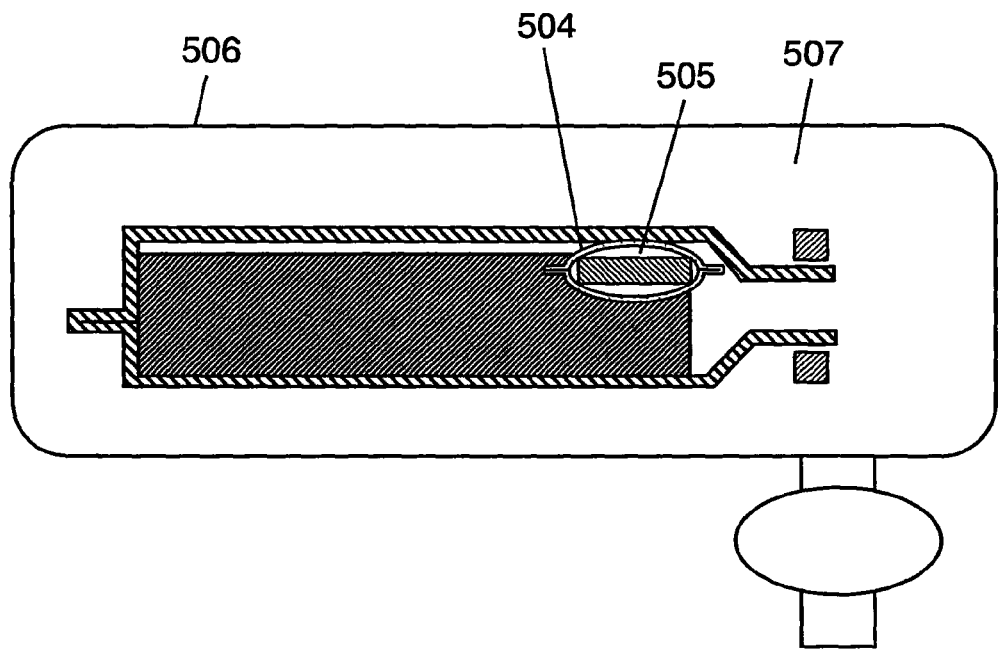
FIG. 29 is a sectional view showing the inside of the vacuum packaging machine during evacuation in the producing process of the vacuum heat insulator in accordance with the fifteenth exemplary embodiment.
Figure 30:
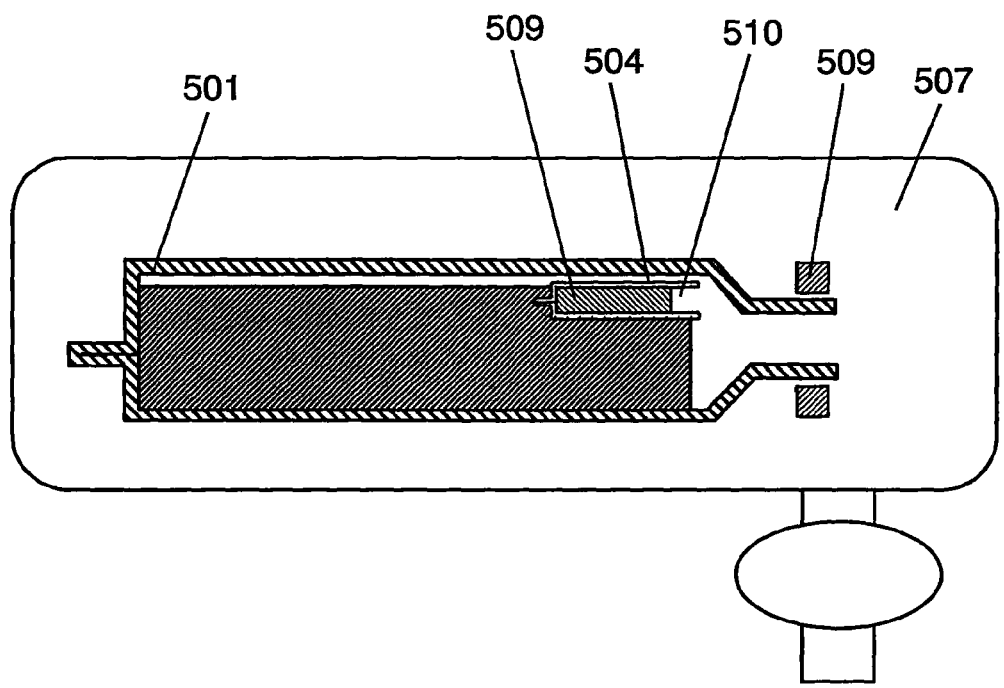
FIG. 30 is a sectional view showing the inside of the vacuum packaging machine just before the completion of evacuation in the producing process of the vacuum heat insulator in accordance with the fifteenth exemplary embodiment.
Figure 31:
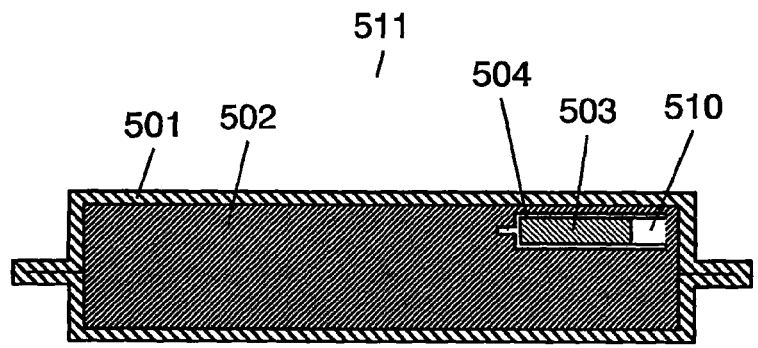
FIG. 31 is a sectional view showing the vacuum heat insulator after vacuum packaging in the producing process of the vacuum heat insulator in accordance with the fifteenth exemplary embodiment.

FIG. 28 is a sectional view showing the inside of a vacuum packaging machine before evacuation in a producing process of a vacuum heat insulator in accordance with a fifteenth exemplary embodiment of the present invention. FIG. 29 is a sectional view showing the inside of the vacuum packaging machine during evacuation. FIG. 30 is a sectional view showing the inside of the vacuum packaging machine just before the completion of evacuation. FIG. 31 is a sectional view showing the vacuum heat insulator after vacuum packaging.

As shown in FIG. 28, jacket container 501 made of a laminated film includes and covers porous core material 502.

Air component adsorbent 503 is made of Ba—Li alloy (combo getter manufactured by SAES Co., Ltd.) or copper-ion-exchanged CuZSM-5 type zeolite.

Air component adsorbent 503 is gas-filled and packaged into adsorbent filling body 504 made of an easy-open film manufactured by Tohcell Co., Ltd. having heat seal strength of 13.5N/15 mm width, together with non-adsorbent gas 505 such as argon gas. The pressure of filled non-adsorbent gas 505 is 1 atm, namely normal pressure.

The main part of vacuum packaging machine 506 has decompressing chamber 507, vacuum pump 508, and heat sealing machine 509 for performing thermal deposition after predetermined evacuation.

In FIG. 29, when vacuum packaging machine 506 is operated and the inside of decompressing chamber 507 is vacuumed to 500 Pa, adsorbent filling body 504 is expanded largely in a balloon shape until it bursts by the pressure difference between the inside of adsorbent filling body 504 and filled non-adsorbent gas 505 of 1 atm pressure.

In FIG. 30, adsorbent filling body 504 is made of the easy-open film manufactured by Tohcell Co., Ltd. having heat seal strength of 13.5N/15 mm width, so that the thermal deposition layer thereof bursts easily to form opening 510, and non-adsorbent gas 509 is exhausted into decompressing chamber 507 through opening 510. Then, just when the degree of vacuum in decompressing chamber 507 becomes a predetermined value of 10 Pa, jacket container 501 is thermally deposited by heat sealing machine 509 to form vacuum heat insulator 511 of FIG. 31.

In the producing process of vacuum heat insulator 511 of the present embodiment, air component adsorbent 503 is burst in the vacuum atmosphere to be vacuum-packaged. Only a minute amount of air component adsorbent 503 therefore comes into contact with air in the producing step. Therefore, air component adsorbent 503 does not degrade even if the producing period becomes long, and can be used without problems. Fluctuation in adsorbing performance due to exposure time in the air atmosphere is eliminated, so that the vacuum heat insulator can be stably produced and has satisfactory long-term reliability advantageously.

As a result, the energy is saved by effectively using long-term high heat insulation performance, thereby contributing to global environment protection.

(Sixteenth Exemplary Embodiment)

Next, a vacuum heat insulator of a sixteenth exemplary embodiment of the present invention is described. The same elements as those in the fifteenth exemplary embodiment are denoted with the same reference marks, and the descriptions of those elements are omitted.

In FIG. 31, vacuum heat insulator 511 has jacket container 501, porous core material 502, and air component adsorbent 503. Air component adsorbent 503 communicates with the vacuum space inside vacuum heat insulator 511 including porous core material 502 through opening 510 of adsorbent filling body 504.

Thus, a minute amount of residual air remaining in porous core material 502 and a minute amount of air infiltrating from the outside can be adsorbed and immobilized by air component adsorbent 503 that communicates with porous core material 502 through the vacuum space. The internal pressure can be kept at a predetermined degree of vacuum or lower.

For evaluating the aging characteristic, vacuum heat insulator 511 is left at rest in air at 80° C. for three months as a promoting test. According to this promoting test, variation in heat conductivity is 1% through 2%, and performance can be sufficiently kept.

Thus, in the present embodiment, high performance of the vacuum heat insulator can be achieved stably for a long time without fluctuation.

The producing process of the vacuum heat insulator of the present invention is as follows. An air component adsorbent and a non-adsorbent gas that is not adsorbed by the air component adsorbent are filled into a filling container. Here, the filling container opens when the pressure outside the filling container becomes lower than the pressure inside the filling container by a predetermined value or more. The filling container and a porous core material are arranged in a jacket container. The inside of the jacket container is decompressed so that the pressure outside the filling container is lower than the pressure inside the filling container by the predetermined value or more, thereby exhausting the non-adsorbent gas from the filling container, together with the air in the jacket container, through the opening drilled in the filling container. Then, the jacket container is sealed. The air component adsorbent, together with the non-adsorbent gas, is filled into the filling container, the filling container opens in the vacuum atmosphere, and the air component adsorbent is vacuum-packaged together with the porous core material. Therefore, contact with the air in the atmosphere does not occur in the producing step and the air component adsorbent does not degrade. The vacuum heat insulator can be used without problems regardless of the amount of the producing time of the vacuum heat insulator. Fluctuation in adsorbing performance due to exposure in the air atmosphere is eliminated, so that the vacuum heat insulator that can be stably produced and has satisfactory long-term reliability is provided.

In the producing process of the vacuum heat insulator of the present invention, the filling container has a structure where the openings of different sizes included in two containers are overlapped and joined to each other so that the opening of one container is blocked by the opening of the other container. When the pressure outside the filling container becomes lower than the pressure inside the filling container by the predetermined value or more, the overlapped and joined part separates. As the filling container, a capsule for medicine or health food can be used.

In the producing process of the vacuum heat insulator of the present invention, the overlapped and joined part of the filling container is previously coated with a lubricant. Thus, deformation is smoothly performed by the pressure difference by the decompression to easily form an opening.

The vacuum heat insulator of the present invention has at least the following elements:

an air component adsorbent arranged in the filling container in which the joint separates to form an opening;
a porous core material; and
a jacket container for storing them.

The air component adsorbent communicates with the continuous space inside the jacket container through the opening. The minute amount of residual air remaining in the porous core material and a minute amount of air infiltrating from the outside can be adsorbed and immobilized by the air component adsorbent that communicates with the porous core material through the continuous space. The internal pressure can be kept at a predetermined degree of vacuum or lower. Thus, high insulation performance can be kept for a long time.

Embodiments of the present invention will be described hereinafter with reference to the accompanying drawings. The present invention is not limited by these embodiments.
(Seventeenth Exemplary Embodiment)

Figure 32:
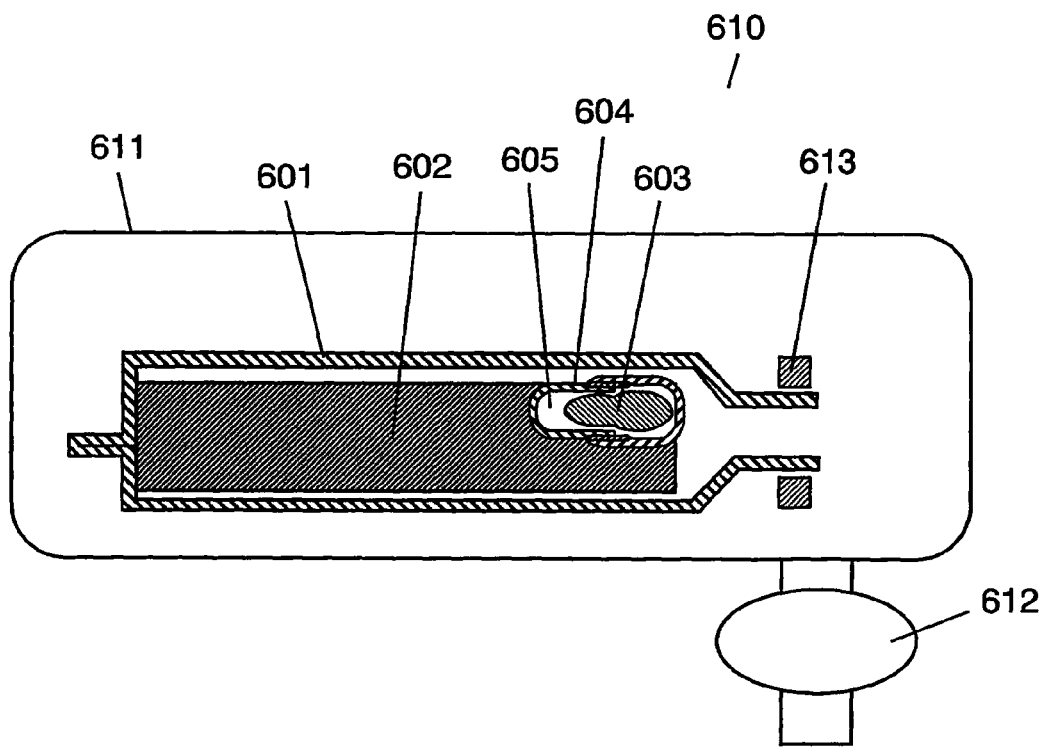
FIG. 32 is a sectional view showing a state before evacuation in a producing process of a vacuum heat insulator in accordance with a seventeenth exemplary embodiment of the present invention.
Figure 33:
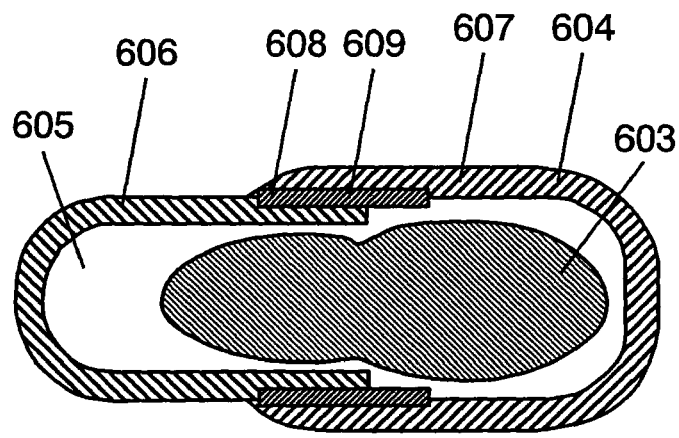
FIG. 33 is an enlarged sectional view showing a filling container used for the vacuum heat insulator in accordance with the seventeenth exemplary embodiment.
Figure 34:
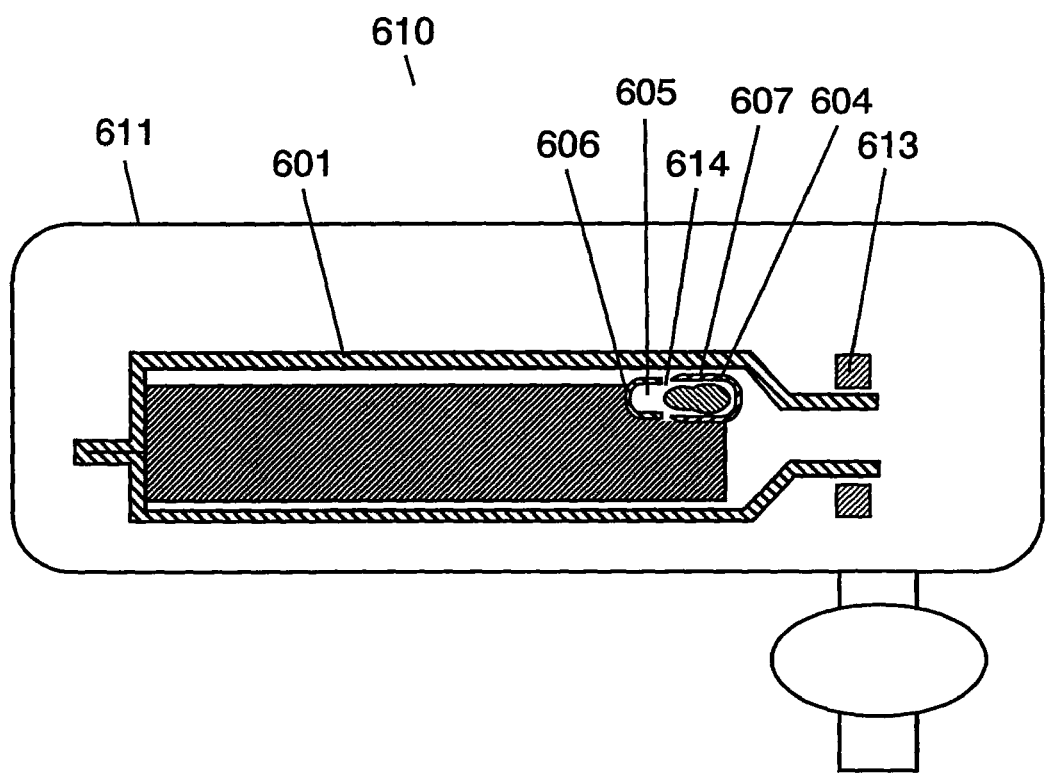
FIG. 34 is a sectional view showing a state just before the completion of evacuation in the producing process of the vacuum heat insulator in accordance with the seventeenth exemplary embodiment.
Figure 35:
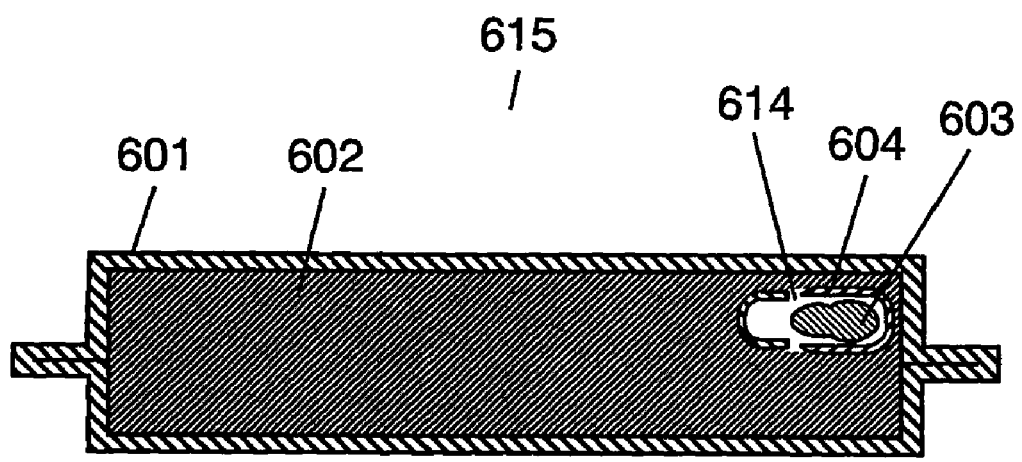
FIG. 35 is a sectional view showing the vacuum heat insulator after vacuum packaging in the producing process of the vacuum heat insulator in accordance with the seventeenth exemplary embodiment.

FIG. 32 is a sectional view showing a state before evacuation in a producing process of a vacuum heat insulator in accordance with a seventeenth exemplary embodiment of the present invention. FIG. 33 is an enlarged sectional view showing a filling container used for the vacuum heat insulator in accordance with the seventeenth exemplary embodiment. FIG. 34 is a sectional view showing a state just before the completion of the evacuation in the producing process of the vacuum heat insulator in accordance with the seventeenth exemplary embodiment. FIG. 35 is a sectional view showing the vacuum heat insulator after vacuum packaging in the producing process of the vacuum heat insulator in accordance with the seventeenth exemplary embodiment.

In FIG. 32, jacket container 601 made of a laminated film includes and covers porous core material 602. Air component adsorbent 603 adsorbs at least nitrogen, and is made of Ba—Li alloy (combo getter manufactured by SAES Co., Ltd.) or copper-ion-exchanged CuZSM-5 type zeolite. Air component adsorbent 603, together with non-adsorbent gas 605 such as argon gas that is not adsorbed by air component adsorbent 603, is filled into filling container 604 formed of a general-purpose capsule for medicine. The pressure of filled non-adsorbent gas 605 is a normal temperature of 1 atm.

As shown by the enlarged sectional view in FIG. 33, filling container 604 formed of the capsule for medicine has no gas permeability or extremely low gas permeability, and has body (one closed-end cylindrical container) 606 and cap (the other closed-end cylindrical container) 607. The openings of different sizes included in two containers (body 606 and cap 607) are joined to each other so that the opening of body 606 is blocked by the opening of cap 607, the opening of body 606 is pressed into the opening of cap 607 to overlap the openings, and they are fast stuck to each other by joint 608, thereby forming filling container 604.

Joint 608 is previously coated with lubricant 609 such as oil for vacuum. When the pressure outside filling container 604 becomes lower than the pressure inside filling container 604 by a predetermined value or more, the overlapped and joined part separates to form an opening.

In FIG. 32, the main part of vacuum packaging machine 610 has decompressing chamber 611, vacuum pump 612, and heat sealing machine 613 for performing thermal deposition after predetermined evacuation.

In FIG. 34, when vacuum packaging machine 610 is operated and the inside of decompressing chamber 611 is vacuumed to 500 Pa, the pressure difference between the inside of filling body 604 and included non-adsorbent gas 605 of 1 atm pressure causes body 606 to separate from cap 607, thereby forming opening 614 in filling body 604 formed of the capsule. Non-adsorbent gas 605 in filling container 604 is exhausted into decompressing chamber 611 through opening 614.

Then, just when the degree of vacuum in decompressing chamber 611 becomes a predetermined value of 10 Pa, jacket container 601 is thermally deposited by heat sealing machine 613 to form vacuum heat insulator 615 of FIG. 35.

In the producing process of the vacuum heat insulator of the present embodiment, since body 606 of filling container 604 separates from cap 607 in the vacuum atmosphere, only a minute amount of air component adsorbent 603 comes into contact with air in the producing step. Therefore, air component adsorbent 603 does not degrade even if the producing period becomes long, and can be used without problems. Fluctuation in adsorbing performance due to exposure time in the air atmosphere is eliminated, so that the vacuum heat insulator can be stably produced and has satisfactory long-term reliability advantageously.

As a result, the energy is saved by effectively using long-term high heat insulation performance, thereby contributing to global environment protection.

Joint 608 of filling container 604 is previously coated with lubricant 609 such as oil for vacuum. Therefore, when filling container 604 is vacuumed as shown in FIG. 34, slip and separation are easily caused at joint 608 by the force due to pressure difference, thereby forming opening 614.

Since body 606 of filling container 604 is more certainly separated from cap 607 due to lubricant 609, air component adsorbent 603 can effectively adsorb and reduce a minute amount of air inside vacuum heat insulator 615 through opening 614.

In FIG. 35, vacuum heat insulator 615 has jacket container 601, porous core material 602, and air component adsorbent 603. Air component adsorbent 603 communicates with the continuous vacuum space inside jacket container 601 including porous core material 602 through opening 614 of filling container 604 formed of a capsule.

A minute amount of residual air remaining in porous core material 602 and a minute amount of air infiltrating from the outside can be adsorbed and immobilized by air component adsorbent 603 that communicates with porous core material 602 through the continuous space. The internal pressure can be kept at a predetermined degree of vacuum or lower. For evaluating the aging characteristic, vacuum heat insulator 615 is left at rest in air at 80° C. for three months as a promoting test. According to this promoting test, variation in heat conductivity is 1% through 2%, and performance can be kept without problems.

Thus, in the present embodiment, high performance of the vacuum heat insulator can be achieved stably without variation for a long time.

Industrial Applicability

When a gas adsorbing device of the present invention is applied to a vacuum apparatus, degradation of a gas adsorbent due to the atmosphere does not occur. After the gas adsorbing device is applied to the vacuum apparatus, its essential performance can be exhibited and the degree of vacuum of the vacuum apparatus can be kept high.

A vacuum heat insulator of the present invention stably achieves high heat insulation performance and can secure long-term reliability. The vacuum heat insulator can be widely applied as a heat insulator for a refrigerator, a thermal insulation container, a vending machine, an electric kettle, an automobile, a railroad vehicle, or a residence. The vacuum heat insulator can produce remarkable effects for saving energy and addressing environmental problems of global warming or the like.

Therefore, the industrial applicability of the present invention is extremely high.

The invention claimed is:

1. A gas adsorbing device comprising a container, the container including:
   a shell for covering a gas adsorbent; and
   a communication part that prevents an inside of the shell from communicating with an outside of the shell when no external force is applied, and allows the inside of the shell to communicate with the outside of the shell by changing a location of the communication part when a predetermined external force is applied,
   wherein a gas adsorbent is included in the container.

2. The gas adsorbing device of claim 1, wherein
the container including the gas adsorbent is formed of two or more members,
a defective part is disposed in at least one of the members to form a communication part, and
gas flow between inner space and outer space of the container is allowed through the defective part by an external force.

3. The gas adsorbing device of claim 1, wherein
the container including the gas adsorbent is formed of two or more members,
a defective part is disposed in each of one and the other of the members, and
gas flow between inner space and outer space of the container is allowed by matching both the defective parts with each other with an external force.

4. The gas adsorbing device of claim 2 or claim 3, wherein the defective part or each of the defective parts is a through hole.

5. The gas adsorbing device of claim 2 or claim 3, wherein the defective part or each of the defective parts is a slit.

6. The gas adsorbing device of claim 2 or claim 3, wherein the members have gas shielding property, and gas permeation in a joint between two or more members is shielded with a grease-like material, and the joint is movable.

7. The gas adsorbing device of claim 1, wherein
the gas adsorbent can adsorb at least one of components contained in air.

8. A vacuum heat insulator, wherein
the gas adsorbing device of claim 7 and a core material are covered with a jacket material, and an inside of the jacket material is decompressed, and gas flows between the gas adsorbing device and the core material.

9. The gas adsorbing device of claim 1, wherein the communication part allows the inside of the shell to communicate with the outside of the shell by moving the communication part when a predetermined external force is applied.

10. A gas adsorbing device comprising a container, the container including:
a shell for covering a gas adsorbent; and
a communication part that prevents an inside of the shell from communicating with an outside of the shell when no external force is applied, and allows the inside of the shell to communicate with the outside of the shell when a predetermined external force is applied,
wherein a gas adsorbent is included in the container, and
wherein the predetermined external force is atmospheric pressure.

* * * * *